United States Patent
Kaminski et al.

(10) Patent No.: US 11,049,205 B2
(45) Date of Patent: *Jun. 29, 2021

(54) SYSTEM AND METHOD FOR ELECTRONICALLY PROVIDING LEGAL INSTRUMENT

(71) Applicant: Goldman Sachs & Co. LLC, New York, NY (US)

(72) Inventors: Raymond John Kaminski, Austin, TX (US); Anthony Edward Bunnell, Austin, TX (US); William Walter Hurley, Austin, TX (US); David Campos Cardona, Austin, TX (US)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/446,062

(22) Filed: Jun. 19, 2019

(65) Prior Publication Data

US 2019/0311448 A1    Oct. 10, 2019

Related U.S. Application Data

(63) Continuation of application No. 15/201,480, filed on Jul. 3, 2016, now Pat. No. 10,373,277.

(Continued)

(51) Int. Cl.
*G06Q 50/18*    (2012.01)
*G06F 21/31*    (2013.01)

(Continued)

(52) U.S. Cl.
CPC ............. *G06Q 50/18* (2013.01); *G06F 21/31* (2013.01); *G06F 21/64* (2013.01); *H04L 63/083* (2013.01); *G06F 2221/2111* (2013.01)

(58) Field of Classification Search
CPC ......... G06Q 50/18; G06F 21/31; G06F 21/64; G06F 2221/2111; H04L 63/083
See application file for complete search history.

(56) References Cited

U.S. PATENT DOCUMENTS 8,868,902 B1    10/2014    Brown et al.
9,166,986 B1 *  10/2015    Saylor .................. H04L 63/123
(Continued)

FOREIGN PATENT DOCUMENTS

| CN | 203102308 U | 7/2013 |
| CN | 103813267 A | 5/2014 |
| CN | 104966163 A | 10/2015 |

OTHER PUBLICATIONS notarize.com as found on the Way Back Machine, Apr. 19, 2015 (Year: 2015).*

(Continued)

*Primary Examiner* — Carrie S Gilkey
(74) *Attorney, Agent, or Firm* — Fenwick & West LLP

(57) ABSTRACT

Disclosed subject matter includes systems and methods for providing a witnessed an electronically executed legal instrument, such as a limited power of attorney. The technology disclosed herein allows for the immediate transfer of a witnessed electronic document meeting today's current standards for witnessing of a document, including proximity of parties, and multiple forms of party identity authentication.

20 Claims, 24 Drawing Sheets

Related U.S. Application Data

(60) Provisional application No. 62/188,351, filed on Jul. 2, 2015.

(51) Int. Cl.
*G06F 21/64* (2013.01)
*H04L 29/06* (2006.01)

(56) References Cited

U.S. PATENT DOCUMENTS

| | | | | |
|---|---|---|---|---|
| 2013/0111208 | A1* | 5/2013 | Sabin | H04L 63/0884 713/171 |
| 2013/0263227 | A1 | 10/2013 | Gongaware et al. | |
| 2013/0325728 | A1 | 12/2013 | Bialostok et al. | |
| 2014/0047524 | A1 | 2/2014 | Auger | |
| 2014/0259129 | A1* | 9/2014 | Copsey | G06F 21/40 726/5 |
| 2015/0150141 | A1 | 5/2015 | Szymanski et al. | |
| 2015/0269692 | A1* | 9/2015 | Ryan | G06Q 50/18 705/311 |
| 2016/0171634 | A1 | 6/2016 | Laine et al. | |

OTHER PUBLICATIONS

European Patent Office, First Examination Report, European Patent Application 16745837.1, dated Aug. 8, 2019, eight pages.
Jain, A. K. et al., "Biometric Template Security," EURASIP Journal on Advances in Signal Processing, Jan. 2008, 17 pages, vol. 2008.
Liao, K. C. et al., "A Novel User Authentication Scheme Based on QR-Code," Journal of Networks, Aug. 2010, pp. 937-941, vol. 5, No. 8.
Notarize, "Person using Notarize app on iPhone in Kitchen," Apr. 19, 2015, one page, [Online] [Retrieved on Mar. 19, 2019], Retrieved from the Internet Archive Way Back Machine <URL: http://notarize.com>.
International Search Report and Written Opinion, PCT Application No. PCT/IB2016/053995, dated Sep. 16, 2016, 12 pages.
United States First Action Interview Pilot Program Pre-Interview Communication, U.S. Appl. No. 15/201,480, dated Feb. 26, 2019, five pages.
Wikipedia, The Free Encyclopedia, "Barcode," Jun. 24, 2015, 19 pages, [Online] [Retrieved on Jan. 12, 2017], Retrieved from the Internet <URL: https://en.wikipedia.org/w/index.php?title=Barcode&oldid=668467038>.
Wikipedia, The Free Encyclopedia, "Exif," Jun. 1, 2015, nine pages, [Online] [Retrieved on Jan. 18, 2017], Retrieved from the Internet <URL: https://en.wikipedia.org/w/index.php?title=Exif&oldid=664942639>.
European Patent Office, Summons to Attend Oral Proceedings, European Patent Application 16745837.1, Mar. 12, 2020, 10 pages.
The Patent Office of the People's Republic of China, Notification of the First Office Action and Search Report, Chinese Patent Application No. 201680051210.0, dated Apr. 6, 2021, 17 pages.

* cited by examiner

SYSTEM AND METHOD FOR ELECTRONICALLY PROVIDING LEGAL INSTRUMENT

CROSS REFERENCE TO RELATED APPLICATIONS

This application is a continuation of U.S. patent application Ser. No. 15/201,480 filed on Jul. 3, 2016 which claims priority to, U.S. Provisional Patent Application No. 62/188,351, filed Jul. 2, 2015, each of which is hereby incorporated by reference in its entirety.

FIELD OF THE INVENTION

This disclosure relates to the execution of legal instruments, including the grant of a power of attorney. More specifically, the disclosure relates to systems and methods for enabling the verifiable grant of a limited power of attorney through an electronic system.

BACKGROUND

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It is known for a person, known as a principal, to grant a limited power of attorney to a third party, known as an agent or attorney-in-fact (hereinafter, collectively "attorney-in-fact"), authorizing or appointing the attorney-in-fact to undertake certain actions on behalf of the principal. Requirements for granting a power of attorney may vary across nations and jurisdictions, including from state to state. Subject matter disclosed herein provides methods and systems for the grant of a limited power of attorney through an electronic system.

Traditionally, execution of legal instruments, such as a power of attorney, may require several actions designed to attest to the authenticity of the execution of the document. Such actions may include verifying that the party authorizing the instrument is the person that is entitled to make such an authorization, as well as the witnessing of the execution, and subsequent signing of the instrument by the witnessing parties. While this sort of verification is achieved in a relatively straightforward manner when the execution of the instrument is being done physically, in person, it becomes significantly more difficult when the executions are done remotely, electronically, and through distributed systems.

If the execution of a legal instrument is done remotely one must be able to verify 1) that the authorizing party is who they are claiming to be, 2) that the one or more witnessing parties are who they claim to be, and 3) that the witnessing parties were physically present when the principal's execution of the instrument occurred.

A technical problem with executing a legal instrument, especially one that requires corroboration of the instrument's execution by the principal via witnessing of the verification, is the authentication of the parties to the instrument's execution, and the verification that the witnessing parties were physically present as witnesses during the principal's execution of the instrument. This is particularly true for electronic execution when the execution action is performed remotely and/or via a distributed system. In such instances of remote execution, it is common to have minimal levels of authentication, such as having the principal use a username and password to enter into a web-portal through which they may then execute the document. Such a single level of authentication is relatively easy to defeat. The implementation of multiple levels of authentication may be beneficial to prevent unauthorized parties from executing such a legal instrument in the place of the authorized principal.

Existing technology and practices are deficient in providing witness verification through electronic mechanisms. Existing technology principally relies upon two-factor verification techniques, such as, possession of a device, coupled with knowledge of a device PIN or password. Some further verification techniques may additionally determine device location. Some further verification techniques may rely upon biometrics.

BRIEF DESCRIPTION

The purpose of this summary is to present integral concepts in a simplified form as a prelude to the more detailed disclosure that is presented herein.

The disclosure provides methods and systems for the verifiable execution of a legal instrument, and specifically a grant of a limited power of attorney, through an electronic system.

The technology disclosed herein allows for the immediate transfer of a witnessed electronic instrument meeting today's current standards for witnessing of a legal instrument, including proximity of parties, and multiple forms of party identity authentication. Furthermore, the present disclosure allows for preparation of witnessed documents across a distributed system.

The methods and systems disclosed herein allows for the utilization of a multitude of pieces of specific data to verify the identity of the parties to the execution of the legal instrument, and to corroborate the witnessing of the execution. In regards to the verification of the identities of the parties the system uses images of both the principal's and a witness's government issued identification cards and images of the individuals associated therewith, as well as identity information received from the individuals (account information in the instance of the principal, and identify information related to the witness provided by the principal in the instance of the witness), and meta-data to verify the identities of the executing parties. Additionally, the system uses location information pulled from the remote devices in combination with a photograph having in it 1) the principal's face, 2) the face of any witnesses, and 3) a barcode transmitted from the server to the parties to the execution (hereinafter referred to as a "selfie"), to verify the physical presence of the witnesses with the principal at the time of the principal's execution of the instrument.

The system may comprise elements suitable for performing a method as herein disclosed. The system and method may utilize two or more remote electronic devices ("RED"s), such as smartphones, and a hosting server. At least one of the remote electronic devices may be associated with an authorizer, and at least one of the remote electronic devices may be associated with a witness. The remote electronic devices may transmit information suitable to verify the validity of the execution of the legal instrument to the server, including but not limited to, information related to the identities of the authorizing and witnessing parties, as well as information related to the parties physical locations at the time of execution of the document. This information may be collected and stored by the server to confirm and corroborate the validity of the execution.

Suitable remote electronic devices may include, but are not limited to, desktop computers, laptop computers, cellular telephones, tablets, and smartphones. The designation of "remote" as used herein means that the device is located in a physical location separate from that of the server.

A method for electronically providing an executed legal instrument may comprise the providing, at a display of a remote electronic device, an account identifier prompt relating to an account identifier. An account identifier as well as identification information for an account user may then be received via an input interface of a user interface of the remote electronic device. An execution prompt relating to acceptable execution input may then be provided at the display of the remote electronic device.

The method may include the receiving, via the input interface of the user interface, execution input responsive to the execution prompt. The execution input may be validated in relation to the acceptable execution input by a processor of the host server. The processor may provide power of attorney information in relation to the identification information of the account user to the requesting principal.

The method may further include providing, at the display, the power of attorney information and a confirmation prompt relating to the power of attorney information. Confirmation input responsive to the confirmation prompt may then be received via the input interface of the user interface, wherein the confirmation input may relate to authorization of the power of attorney information for the account user.

In an embodiment, at least some of the following may be stored in the memory of the system: confirmation input, power of attorney information, identification information, information received from the remote electronic devices associated with the principal and/or any witnesses, including pictures, meta-data, execution input, etc.

Descriptions of certain illustrative aspects are described herein in connection with the associated Figures. These aspects are indicative of various non-limiting ways in which the disclosed subject matter may be utilized, all of which are intended to be within the scope of the disclosed subject matter. Other advantages, emerging properties, and features will become apparent from the following detailed disclosure when considered in conjunction with the associated Figures that are also within the scope of the disclosure.

BRIEF DESCRIPTION OF THE DRAWINGS

The disclosed subject matter itself, as well as further objectives, and advantages thereof, will best be illustrated by reference to the following detailed description of embodiments of the device read in conjunction with the accompanying Figures, wherein.

DETAILED DESCRIPTION

Figure 1:
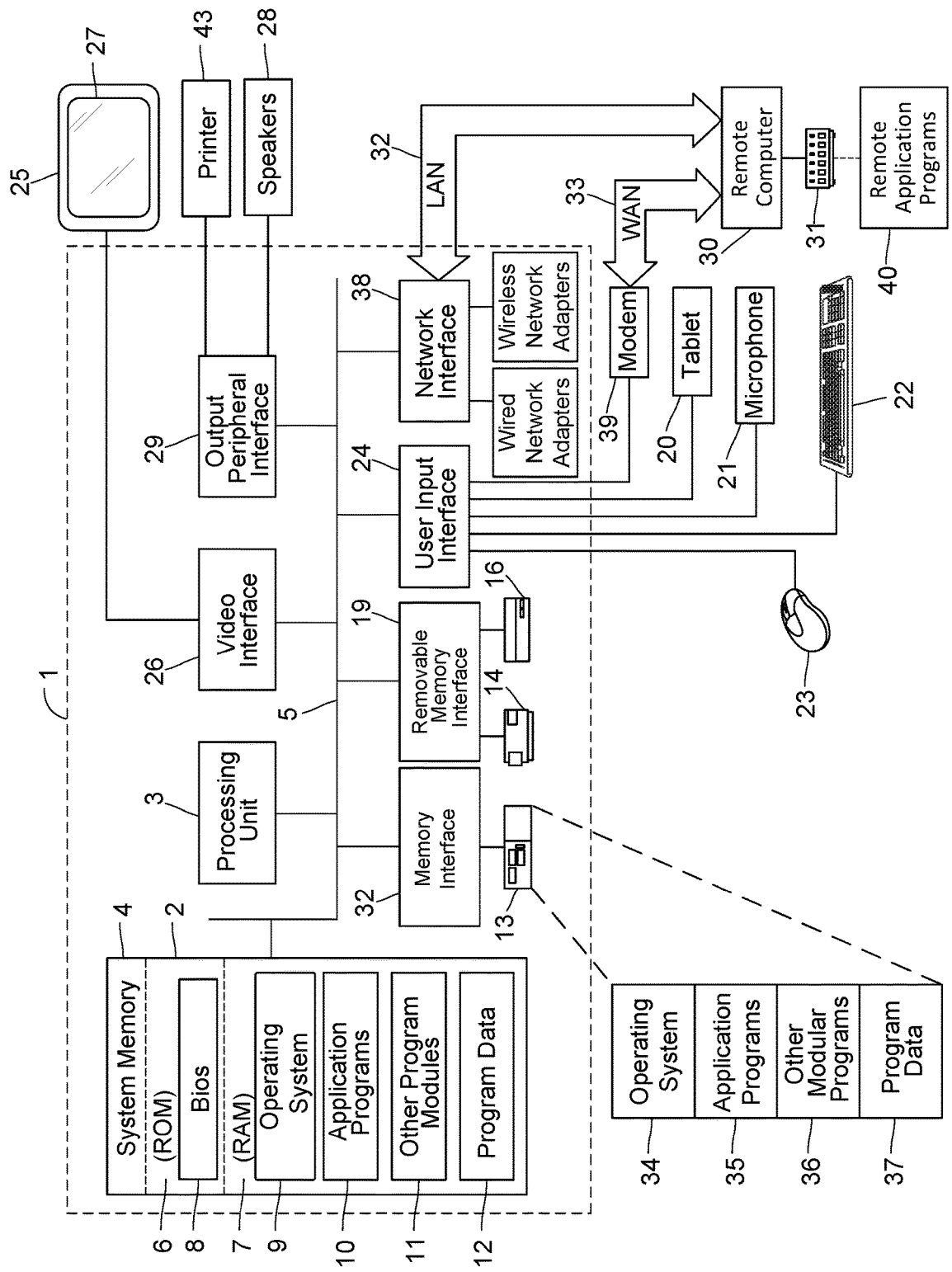
FIG. 1 is a partial schematic illustration of a computing system that may be utilized in a system and method in accordance with an embodiment.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including," when used in this specification, specify the presence of stated features, regions, integers, steps, operations, elements, and/or components, but do not preclude the presence or addition of one or more other features, regions, integers, steps, operations, elements, components, and/or groups thereof.

Although described with reference to personal computers and the Internet, on skilled in the art could apply the principles discussed herein to any computing or mobile computing environment. Further, one skilled in the art could apply the principles discussed herein to communication mediums beyond the Internet.

It will be appreciated that, for simplicity and clarity of illustration, where considered appropriate, reference numerals may be repeated among the Figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein.

The detailed description set forth herein in connection with the appended Figures is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

In the following detailed description, reference is made to the accompanying Figures that form a part hereof, and in which is shown by way of illustration specific implementations which may be practiced. These implementations are described in sufficient detail to enable those skilled in the art to practice the implementations, and it is to be understood that other implementations may be utilized and that logical, mechanical, electrical and other changes may be made without departing from the scope of the implementations. The following detailed description is, therefore, not to be taken in a limiting sense.

The system and methods disclosed herein utilize multiple, redundant, levels of authentication to corroborate the identities of the parties to the legal instruments' execution.

The principal's identity may be confirmed through 1) logging into the server system through the use of a username and password, 2) the providing of images of a government issued identification card, 3) the providing of a photograph of the principal with meta-data corroborating its veracity, 4) the witnesses' attesting to the principal's identity via the execution of the instrument by a witness, and possibly 5) the principal's providing of a physical signature inputted into a remote electronic device via an input device.

The witness' identity may be confirmed through 1) the principal's providing witness contact and identity information, 2) the providing of images of a government issued identification card, 3) the providing of a photograph of the witness with meta-data corroborating its veracity, and possibly 4) the witness' providing of a physical signature inputted into a remote electronic device via an input device.

The presence of the witness at the time and place of the principal's execution of the legal instrument may be confirmed by 1) the providing by the witness of a selfie having in it the witness, the principal, and the server generated barcode provided to the principal, along with associated meta-data corroborating the its veracity; and 2) the providing by the principal of a selfie having in it the witness, the principal, and the server generated barcode provided to the witness, along with associated meta-data corroborating its veracity.

With reference to FIG. 1, an exemplary system within a computing environment for implementing the disclosure (i.e. the host server) includes a general purpose computing device in the form of a computing system 1, commercially available from, for example, Intel, IBM, AMD, Motorola, Cyrix, etc. Components of the computing system 2 may include, but are not limited to, a processing unit 3, a system memory 4, and a system bus 5 that couples various system components including the system memory 4 to the processing unit 3. The system bus 5 may be any of several types of bus structures including a memory bus or memory controller, a peripheral bus, or a local bus using any of a variety of bus architectures.

Computing system 1 typically includes a variety of computer readable media. Computer readable media can be any available media that can be accessed by the computing system 1 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing system 1.

The system memory 4 includes computer storage media (memory) in the form of volatile and/or nonvolatile memory such as read only memory (ROM) 6 and random access memory (RAM) 7. A basic input/output system (BIOS) 8, containing the basic routines that help to transfer information between elements within computing system 1, such as during start-up, is typically stored in ROM 6. RAM 7 typically contains data and/or program modules that are immediately accessible to and/or presently being operated on by processing unit 3. By way of example, and not limitation, an operating system 9, application programs 10, other program modules 11, and program data 12 are shown.

Computing system 1 may also include other removable/non-removable, volatile/nonvolatile computer storage media. By way of example only, a hard disk drive 13 that reads from or writes to non-removable, nonvolatile magnetic media, a magnetic disk drive 14 that reads from or writes to a removable, nonvolatile magnetic disk 15, and an optical disk drive 16 that reads from or writes to a removable, nonvolatile optical disk 17 such as a CD ROM or other optical media could be employed to store the invention of the present embodiment. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 13 is typically connected to the system bus 5 through a non-removable memory interface such as interface 18, and magnetic disk drive 14 and optical disk drive 16 are typically connected to the system bus 5 by a removable memory interface, such as interface 19.

The drives and their associated computer storage media, discussed above, provide storage of computer readable instructions, data structures, program modules and other data for the computing system 1. For example, hard disk drive 13 is illustrated as storing operating system 34, application programs 35, other program modules 36, and program data 37. Note that these components can either be the same as or different from operating system 9, application programs 10, other program modules 11, and program data 12. Operating system 34, application programs 35, other program modules 36, and program data 37 are given different numbers here to illustrate that, at a minimum, they are different copies.

A user may enter commands and information into the computing system 1 through input devices such as a tablet, or electronic digitizer 20, a microphone 21, a keyboard 22, and pointing device 23, commonly referred to as a mouse, trackball, or touch pad. These and other input devices are often connected to the processing unit 3 through a user input interface 24 that is coupled to the system bus 5, but may be connected by other interface and bus structures, such as a parallel port, game port or a universal serial bus (USB).

A monitor 25 or other type of display device is also connected to the system bus 5 via an interface, such as a video interface 26. The monitor 25 may also be integrated with a touch-screen panel 27 or the like. Note that the monitor and/or touch screen panel can be physically coupled to a housing in which the computing system 1 is incorporated, such as in a tablet-type personal computer or a smartphone. In addition, computers such as the computing system 1 may also include other peripheral output devices such as speakers 28 and printer 43, which may be connected through an output peripheral interface 29 or the like.

Computing system 1 may operate in a networked environment using logical connections to one or more remote computers, such as a remote computing system 30. The remote computing system 30 may be a personal computer (including, but not limited to, desktops, tablets, laptops, smartphones, and other such suitable remote electronic devices), a server, a router, a network PC, a peer device or other common network node, and typically includes many or all of the elements described above relative to the computing system 1, although only a memory storage device 31 has been illustrated. The logical connections depicted include a local area network (LAN) 32 connecting through network interface 38 and a wide area network (WAN) 33 connecting via modem 39, but may also include other networks. Such networking environments are commonplace in offices, enterprise-wide computer networks, intranets, and the Internet.

For example, in the present embodiment, the computer system 1 may comprise the source machine (i.e. a host server) from which data is being generated/transmitted and the remote computing system 30 may comprise the destination machine. Note however that source and destination machines need not be connected by a network or any other means, but instead, data may be transferred via any media capable of being written by the source platform and read by the destination platform or platforms.

In another example, in the present embodiment, the remote computing system 30 may comprise the source machine from which data is being generated/transmitted and the computer system 1 may comprise the destination machine.

In a further embodiment, in the present disclosure, the computing system 1 may comprise both a source machine from which data is being generated/transmitted and a destination machine and the remote computing system 30 may also comprise both a source machine from which data is being generated/transmitted and a destination machine.

Referring to FIG. 1, for the purposes of this disclosure, it will be appreciated that remote computer 30 may include any suitable term such as, but not limited to, "device", "processor based mobile device", "mobile device", "remote electronic device", "processor based mobile electronic device", "mobile electronic device", and "wireless electronic device", and may include devices such as, but not limited to, a smart phone, laptop, or tablet computer.

The central processor operating pursuant to operating system software such as, but not limited to Apple IOS®, Google Android®, IBM OS/2®, Linux®, UNIX®, Microsoft Windows®, Apple Mac OSX®, and other commercially available operating systems provides functionality for the services provided by the present invention. The operating system or systems may reside at a central location or distributed locations (i.e., mirrored or standalone).

Software programs or modules instruct the operating systems to perform tasks such as, but not limited to, facilitating client requests, system maintenance, security, data storage, data backup, data mining, document/report generation, and algorithm generation. The provided functionality may be embodied directly in hardware, in a software module executed by a processor, or in any combination of the two.

Furthermore, software operations may be executed, in part or wholly, by one or more servers or a client's system, via hardware, software module, or any combination of the two. A software module (program or executable) may reside in RAM memory, flash memory, ROM memory, EPROM memory, EEPROM memory, registers, hard disk, a removable disk, a CD-ROM, DVD, optical disk, or any other form of storage medium known in the art. An exemplary storage medium is coupled to the processor such that the processor can read information from, and write information to, the storage medium. In the alternative, the storage medium may be integral to the processor. The processor and the storage medium may also reside in an application specific integrated circuit (ASIC). The bus may be an optical or conventional bus operating pursuant to various protocols that are well known in the art.

Figure 2:
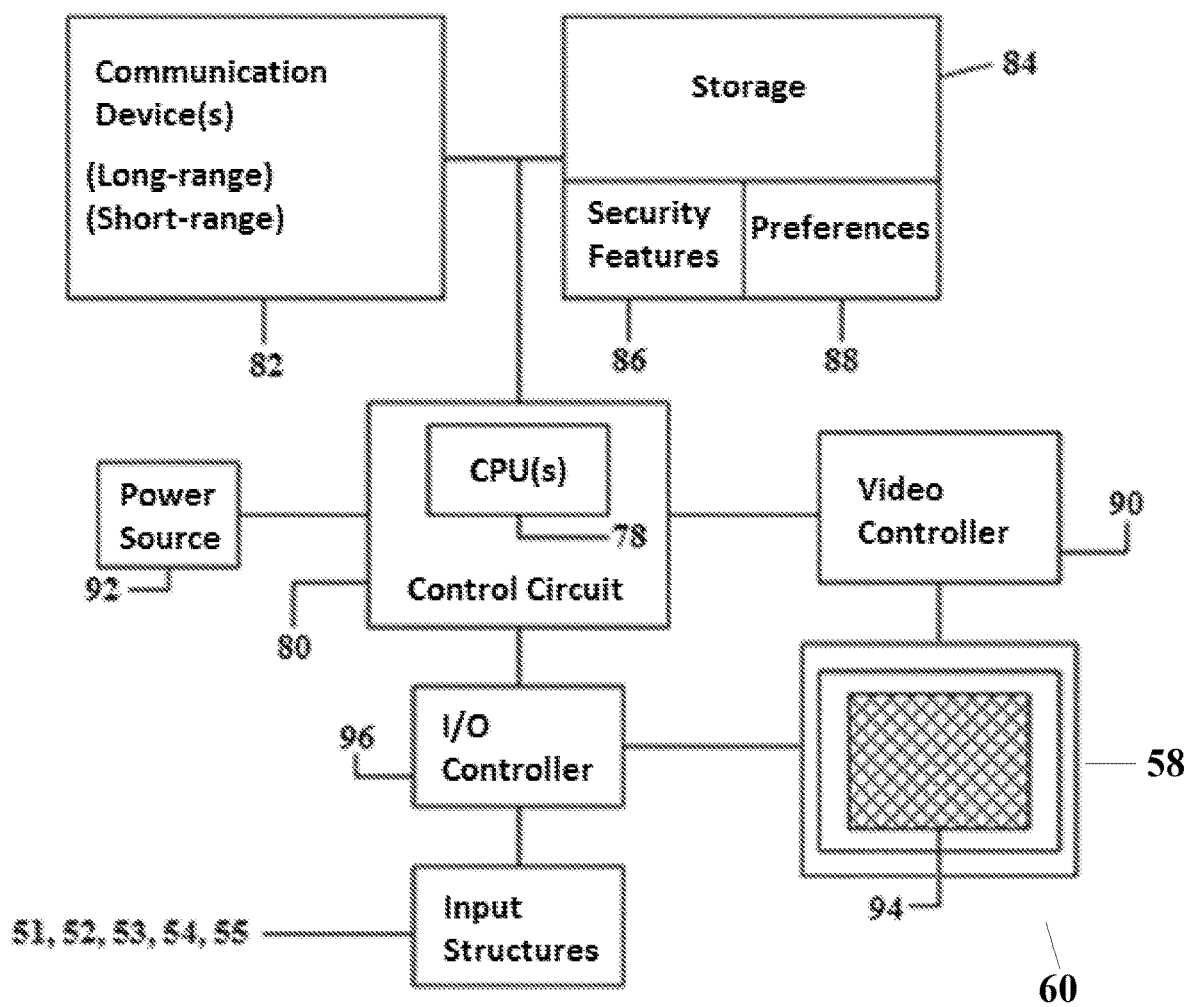
FIG. 2 depicts a block layout of a remote electronic device of FIG. 1 in accordance with an embodiment.

FIG. 2 depicts a block layout of a remote electronic device 30 of FIG. 1 in accordance with an embodiment. The device 30 may include the above discussed display 58, as well as a CPU 78, a touch screen interface 94, an I/O controller 96, a storage device 84, one or more communication interfaces 82, a video controller 90, control circuitry 80, and a power source 92.

The central processing unit (CPU) 78 and the control circuit 80 may control the operation of the electronic device 30. In conjunction, these elements may provide the processing capability required to execute an operating system, application programs ("apps"), the GUI 60, and any other functions provided on the device 30. The control circuit 80 may include one or more data buses for transferring data and instructions between components of the device 30. The control circuit 80 also may further include on board memory (RAM) for caching purposes.

The CPU 78 may include one or more processors. For example, the CPU 78 may include "general purpose" microprocessors, a combination of general and application-specific microprocessors, instruction set processors, graphics processors, video processors, as well as related chips sets and/or special purpose microprocessors. The device 30 may also include (not shown in FIG. 2) a standalone random access memory (RAM) in communication with the CPU 78 by way of one or more memory controllers, which may be integrated within the control circuit 80.

The CPU 78 may use information that may be stored within a long-term storage device, represented by reference numeral 84. The storage device 84 of the electronic device 30 may be utilized for storing data required for the operation of the CPU 78, data to be processed or executed by the CPU 78, as well as other data required by the electronic device 30, such as application and program data. For, example, the storage device 84 may be configured to store the firmware for the electronic device 30 that is used by the CPU 78. The firmware may include an operating system, as well as other programs or drivers that enable various functions of the electronic device 30, GUI functions, and/or processor functions. The storage device 84 may also store components for the GUI 60, such as graphical elements, screens, and templates. The storage device 84 may also store data files such as media (e.g., music and video files), image data, application software, preference information (e.g., media playback preferences, general user preferences), network connection information (e.g., information that may enable the electronic device 30 to establish a wireless connection, such as a telephone or Internet connection), subscription information (e.g., information that maintains a record of television shows or other media to which a user subscribes), telephone information (e.g., telephone numbers), and any other suitable data required by the electronic device 30. The long term storage 84 may be non-volatile memory such as read only memory, flash or solid state memory, a hard disk drive, or any other suitable optical, magnetic, or solid-state computer readable media, as well as a combination thereof.

Included in the electronic device 30 may be one or more network communication devices 82 for providing additional connectivity channels for receiving and transmitting information. For example, the communication device 82 may represent a network controller as well as various associated communication protocols. The communication device 82 may provide for various long-range communication interfaces, such as a wireless local area network (WLAN) interface (e.g., an IEEE 802.11x wireless network), a local area network (LAN) interface 32, or a wide area network (WAN) interface 33. For example, a WAN interface 33 may permit a private and/or secure connection to a cellular data network, such as the 3G or 4G network. The network communication device 82 may further provide a short message service (SMS) interface.

The communication device 82 may further provide for short-range communication interfaces, such as a personal area network (PAN) interface. The PAN interface may provide capabilities to network with, for example, a Bluetooth® network, an ultra-wideband network (UWB), or near field communication (NFC). The communication device 82 may include any number and combination of network interfaces. As will be acknowledged, the network device may employ one or more protocols, such as the High-Speed Downlink Packet Access (HSDPA) protocol, for rapidly downloading data over a network. The network communication device 82 may additionally allow the electronic device 30 to receive software upgrades.

The electronic device 30 may further include a service discovery networking protocol to establish a connection with an external device through a network interface in specific embodiments. For example, both the electronic device 30 and the external device may broadcast identification information using Internet protocol standards (IP). The external device may additionally broadcast information relating to the available services the external device is capable of providing (e.g., printing services for a networked printer). The devices may then use the identification information to establish a network connection between the devices.

Properties of the above-mentioned communication interfaces provided by the network communication device 82 may further be determined by user preference settings 88. The user preference settings 88 may be stored in the storage device 84. For instance, the preferences 88 may include a list of networks that the electronic device 30 may connect to and may further govern the order or priority between the communication interfaces.

Further, the communication preferences associated with the preferences 88 may be further dependent upon security features 86 available for each respective communication interface. The security features 86 may be stored in the storage device 84 and may include one or more cryptographic protocols, such as a secure sockets layer (SSL) protocol or a transport layer security (TLS) protocol, for establishing secure communications between the electronic device 30 and an external device. The security features 86 may also include one or more encryption applications for encrypting information sent from the electronic device 30. These features may be particularly useful when transmitting information of a sensitive nature, which may generally include credit card and bank account information.

To limit access to the sensitive data, such as encryption keys, passcodes and passwords, digital certificates, or the like, the security features 86 may also include a secure access-restricted storage area (e.g., within the storage device 84). Additionally, in some embodiments, the secure storage area 84, in addition to storing the above-mentioned sensitive data, may be further protected by its own respective password or authorization "personal identification number" (PIN), for example, in order to prevent unauthorized access to the information stored therein.

The video controller 90 may be operatively coupled to the display 58 and configured to receive image data and to send voltage signals corresponding to the pixel values of the image data to the display 58. The displayed image data may represent information received through the communication interface 82, as well as information contained in the storage device 84. As will be understood by those skilled in the art, pixel values may be numerical assignments corresponding to respective pixel intensities. Therefore, the display 58 may receive the voltage signals from the video controller 90 as an input and produce an image corresponding to the voltage signals. With reference to FIGS. 5, 6, 7, and 8 an image produced by the signals provided by the video controller 90 may represent a screen of the GUI 60 described above.

A user may select various graphical elements which may represent applications or information that may be displayed through the GUI 60. A touch screen interface 94 may be positioned in front of or behind the display 58 and may provide a user the ability to select graphical elements, such as icons displayed by the GUI 60. The touch screen interface 90 may be configured to receive inputs based on a physical contact (e.g., touching the display 58 when engaging an icon) either by the user or an object (e.g., stylus) being controlled or manipulated by the user, and to send "touch event" information to the CPU 78. The CPU 78 may then process the detected touch event information and perform a corresponding action. For example, the "touching" of icons may be processed by the CPU 78 as an instruction to execute or initiate the corresponding application. The touch screen interface 94 may employ any suitable type of touch screen technology such as resistive, capacitive, infrared, surface acoustic wave, electromagnetic, or near field imaging. The touch screen interface 94 may further include single point or multipoint sensing.

A user may communicate with the CPU 78 through various input structures utilizing the infrastructure provided by the I/O controller 96. The input structures provided on the electronic device 30 include input complexes represented by the reference numerals 51, 52, 53, 54, and 55. The user input structures 51, 52, 53, 54, and 55 may be used in conjunction with, or independently of, the touch screen interface 94 to provide input information to the electronic device 30.

The electronic device 30 may be powered by the power source 92 in both non-portable and portable settings. In a portable setting, for instance, in order to facilitate transport and ease of motion, the electronic device 30 may include an integrated power source 92 for powering the electronic device 30. The power source 92 may include one or more batteries, such as a Li-Ion battery, which may be user-removable or secured to the electronic device 30. In specific embodiments, a proprietary connection I/O port may be used to connect the electronic device 30 to a power source in order to recharge the battery. In other embodiments, the one or more batteries may be non-integrated and may include one or more rechargeable or replaceable batteries. Further, in a non-portable setting, the power source 92 may include AC power, such as provided by an electrical outlet.

Depicted screen images may be generated by the GUI 60 and displayed on the display 58. For instance, these screen images may be generated as the user interacts with the electronic device 30, such as via the input structures 51, 52, 53, 54, and 55, and/or the touch screen interface 94. As discussed above, the GUI 60, depending on the inputs and selections made by a user, may display various screens including icons and graphical elements. These elements may represent graphical and virtual elements or "buttons" which may be selected by the user by physically touching their respective location on the display 58 using the touch screen interface 94, for example. Further, the functionalities set forth and described in the subsequent figures may be achieved using a wide variety of graphical elements and visual schemes. Thus, it should also be understood that the present disclosure is not intended to be limited to the precise user interface conventions depicted herein. Embodiments of the present invention may include a wide variety of GUI 60 styles.

In embodiments, wireless electronic device 30 may be wireless electronic device 310. In embodiments, display 58 may be display 315. In embodiments, GUI 60 may be user interface 317. In embodiments, engageable input 318 may be one of input structures 51, 52, 53, 54, and 55.

Figure 3:
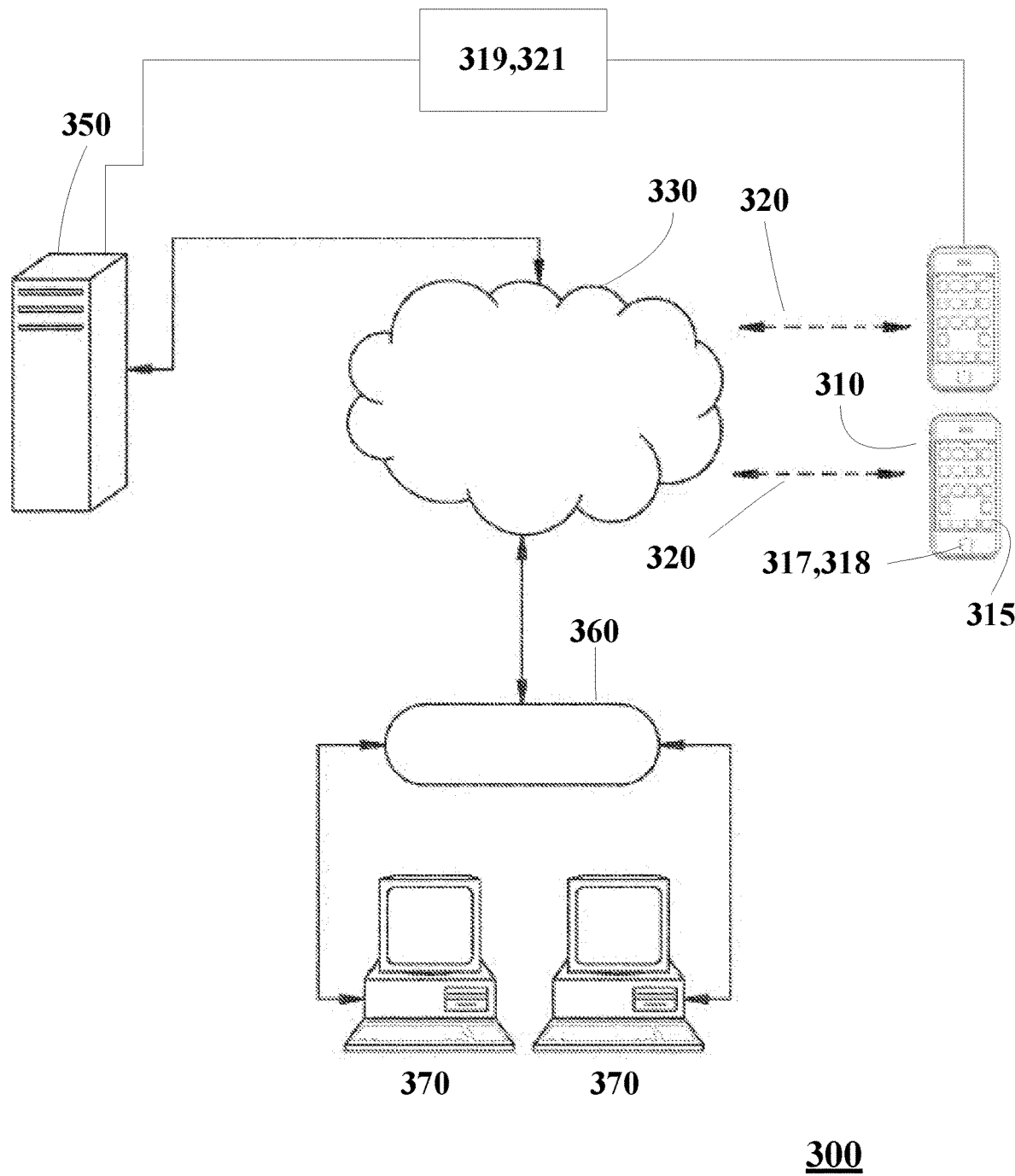
FIG. 3 is a schematic illustration illustrating aspects of a system in an embodiment.
Figure 4:
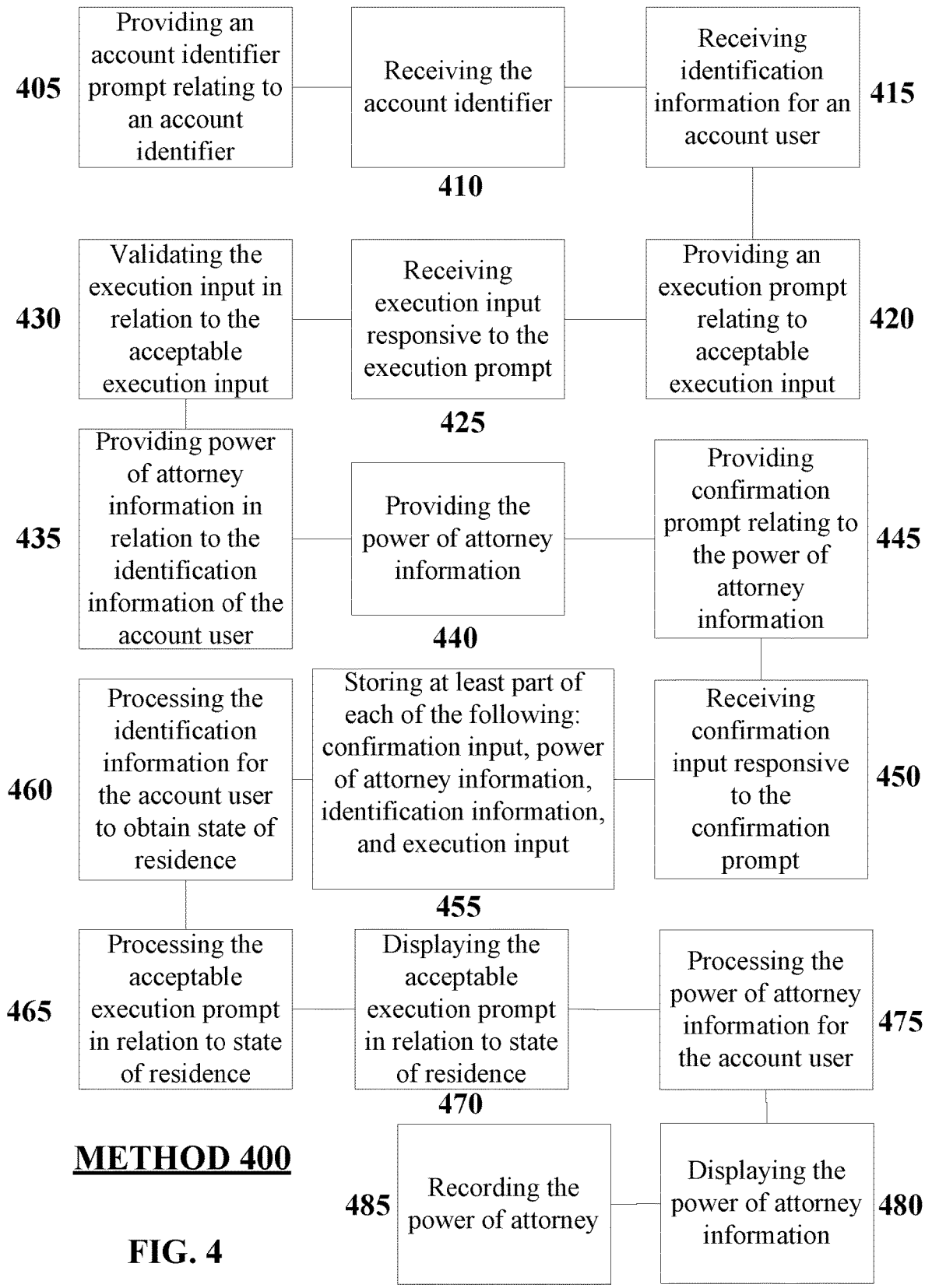
FIG. 4 is a block diagram illustrating aspects of method 400 in an embodiment.

Illustrated in FIG. 4 is an embodiment of a method 400 for providing a limited power of attorney via operation of an automated system. It will be understood that method 400 may be performed by operation of any suitable system having an arrangement or configuration operable to perform method 400 as herein disclosed. In one embodiment, such a system may be substantially identical to system 300 illustrated in FIG. 3 and elsewhere described herein.

Referring to FIG. 4, method 400 may include providing 405, at a display 315 of a wireless electronic device, an account identifier prompt relating to an account identifier. It will be understood that providing 405 may be performed by any suitable wireless electronic device, such as a wireless electronic device 310 of system 300. For example, a suitable wireless electronic device 310 may have a display 315 configured to provide an account identifier prompt 530 relating to an account identifier. It will be understood that in the providing 405, an account identifier prompt 530 may by displayed to request that a user of the wireless electronic device 310 input an account identifier into system 300 by entering via a user interface 317 of wireless electronic device 310 an account user's account identification information of an account existing with a third party account provider. One of ordinary skill will understand that an account identifier, for example, may include identifying information for an account of an account user, such as an individual, with a third party account provider, such as a financial institution.

Figure 5:
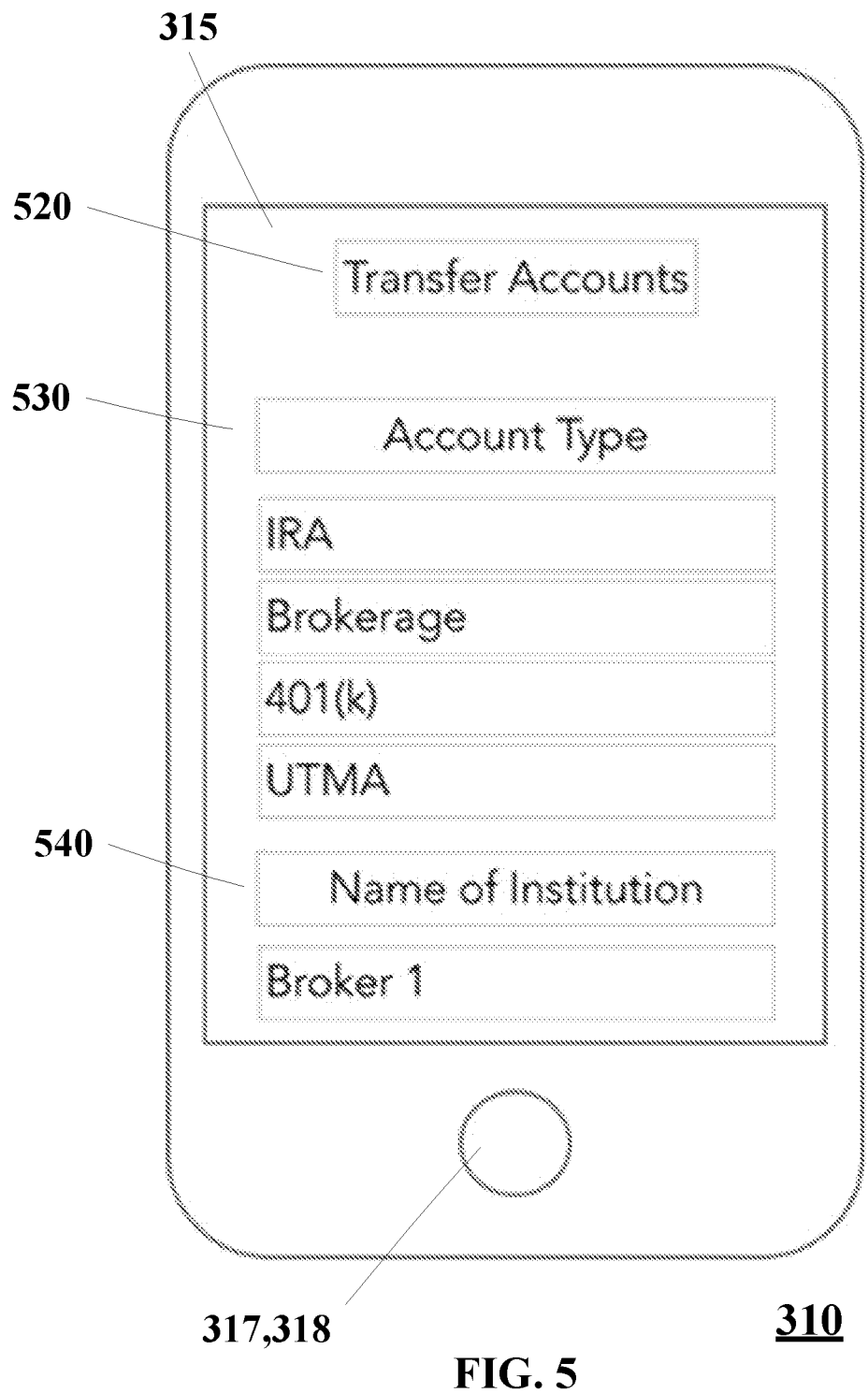
FIG. 5 is a partial front perspective view showing a wireless electronic device in accordance with an embodiment with a display in accordance with aspects of disclosed subject matter.

Referring to FIG. 5, it will be understood that an account may be, for example, a financial account such as, without limitation, an Individual Retirement Account (IRA), brokerage account, 401(k) account, or custodial account (such as, for example, a Uniform Transfers to Minors Account (UTMA) or Uniform Gift to Minors Account (UGMA)). It will be understood that any suitable financial account or asset account may be the subject of method 400. In embodiments, at least one of an account identification title 520 and an institution prompt 540 may be displayed along with the account identifier prompt 530. In embodiments, the account identification title 520 may identify an action that may take place by the wireless electronic device 310 when initiated by a user. In embodiments, the institution prompt 540 may identify one or more institutions associated with accounts of a user that may be the subject to a limited power of attorney granted according to the user of the wireless electronic device 310.

Referring to FIG. 4, method 400 may include receiving 410, at an engageable input 318 of a user interface 317 of the wireless electronic device 310, the account identifier. In an embodiment, for example, in the receiving 410 such an account identifier may be received at an engageable input 318 of a user interface 317 of the wireless electronic device 310 (shown in FIG. 3). In embodiments, the account identifier may identify an account of the account user, that is to be the subject of granting a limited power of attorney. In embodiments, multiple accounts and account identifiers may be the subject of method 400.

Referring to FIG. 4, method 400 may include receiving 415, at the wireless electronic device 310, identification information of an account user. In an embodiment, for example, the receiving 415 of identification information of an account user may be received at an engageable input 318 of a user interface 317 of the wireless electronic device 310 (shown in FIG. 3). In an embodiment, the receiving 415 of the identification information may comprise receiving government accepted identification (such as driver's license, passport, id card, etc.) information of the account user. In an embodiment, the receiving 415 of the identification information may comprise identification information of the account user, wherein the identification information may be obtained from an image of a portion of a government accepted identification (such as driver's license, passport, id card, etc.) of the account user. In an embodiment, the receiving 415 of identification information may comprise identification information of the account user, wherein the identification information may be obtained from a scan of a unique identifier of a government accepted identification (such as driver's license, passport, id card, etc.) of the account user. In an embodiment, the receiving 415 of identification information may comprise identification information of the account user, wherein the identification information may be obtained from a scan of a unique barcode of a government accepted identification (such as driver's license, passport, id card, etc.) of the account user.

Referring to FIG. 4, method 400 may include providing 420, at the display, an execution prompt relating to acceptable execution input. In an embodiment, for example, the providing 420 of execution input responsive to the execution prompt may be provided at display 315 of wireless electronic device 310 (shown in FIG. 3). In an embodiment, for example, the providing 420 of the acceptable execution input may relate to a state specific requirement for execution of a power of attorney. In an embodiment, for example, the providing 420 of the acceptable execution input may be responsive to a state specific requirement for execution of a power of attorney. In an embodiment, for example, the providing 420 of the acceptable execution input may include witness information. In an embodiment, for example, the providing 420 of the acceptable execution input may comprise an image of a witness, the image acquired by a camera element of the wireless electronic device. In an embodiment, for example, the providing 420 of the acceptable execution input may comprise an image of the account user, wherein the image may be acquired by a camera element of the wireless electronic device. In an embodiment, for example, the providing 420 of the acceptable execution input may comprise an image of the account user and witness, wherein the image may be acquired by a camera element of the wireless electronic device. In an embodiment, for example, the providing 420 of the acceptable execution input may comprise government accepted identification (such as driver's license, passport, id card, etc.) information of a witness. In an embodiment, for example, the providing 420 of the acceptable execution input may comprise identification information of a witness, wherein the identification information may be obtained from an image of a portion of a government accepted identification (such as driver's license, passport, id card, etc.) of the witness. In an embodiment, for example, the providing 420 of the acceptable execution input may comprise identification information of a witness, wherein the identification information may be obtained from a scan of a unique identifier contained on the mobile device or a government accepted identification source of the witness. In an embodiment, for example, the providing 420 of the acceptable execution input may comprise identification information of the witness, wherein the identification information may be obtained from a scan of a unique barcode or other information contained on the mobile device or a government accepted form of identification (such as driver's license, passport, state issued ID card, etc.) of the witness.

In embodiments, the acceptable execution input (such as, but not limited to witness information) may be transferred from a witness's wireless electronic device to server 350 using any appropriate means to transfer the data. In embodiments, the acceptable execution input may be routed to an account user's wireless electronic device from server 350. For example, an image of a witness may be sent from a witness's wireless electronic device to server 350. The server may then route the image to an account user's wireless electronic device.

Referring to FIG. 4, method 400 may include receiving 425, at an engageable input 317 of the user interface 318, execution input responsive to the execution prompt. In an embodiment, for example, the receiving 425 of execution input responsive to the execution prompt may be received at an engageable input 318 of a user interface 317 of the wireless electronic device 310 (shown in FIG. 3). In an embodiment, for example, the receiving 425 of the execution input may relate to a state specific requirement for execution of a power of attorney. In an embodiment, for example, the receiving 425 of the execution input may be responsive to a state specific requirement for execution of a power of attorney. In an embodiment, for example, the receiving 425 of the execution input may include witness information. In an embodiment, for example, the receiving 425 of the execution input may include witness information for two witnesses. It will be understood that execution input may be received to comply with applicable legal standards for execution of a limited power of attorney in a jurisdiction. In an embodiment, for example, the receiving 425 the execution input may comprise an image of a witness, wherein the image may be acquired by a camera element of the wireless electronic device 310. In an embodiment, for example, the receiving 425 of the execution input may comprise an image of the account user, wherein the image may be acquired by a camera element of the wireless electronic device 310. In an embodiment, for example, the receiving 425 of the execution input may comprise an image of the account user and witness, wherein the image may be acquired by a camera element of the wireless electronic device 310. In an embodiment, for example, the receiving 425 of the execution input may comprise government accepted identification (such as driver's license, passport, id card, etc.) information of a witness. In an embodiment, for example, the receiving 425 of the execution input may comprise identification information of a witness, wherein the identification information may be obtained from an image of a portion of a government accepted identification of the witness. In an embodiment, for example, the receiving 425 of the execution input may comprise identification information of a witness, wherein the identification information may be obtained from a scan of a unique identifier contained on the mobile device or a government accepted identification of the witness. In an embodiment, for example, the receiving 425 of the execution input may comprise identification information of the witness, wherein the identification information may be obtained from a scan of a unique barcode or other information contained on the mobile device or a government accepted form of identification (such as driver's license, passport, state issued ID card, etc.) of the witness.

In embodiments, the acceptable execution input (such as, but not limited to witness information) may be transferred from a witness's wireless electronic device to server 350 using any appropriate means to transfer the data. In embodiments, the acceptable execution input may be routed to an account user's wireless electronic device from server 350. For example, an image of a witness may be sent from a witness's wireless electronic device to server 350. The server may then route the image to an account user's wireless electronic device.

Referring to FIG. 4, method 400 may include validating 430, by a processor, the execution input in relation to the acceptable execution input. In an embodiment, for example, the validating 430 of the execution input may be validated in relation to the acceptable execution input by a processor of system 300 such as the processor of the wireless electronic device 310 (which may be similar to the processing unit 3 of FIG. 1 in embodiments) or server 350 of system 300. In an embodiment, for example, the validating 430 may further comprise validating age of a witness. It will be understood that the validated age of a witness may be received to comply with applicable legal standards for execution of a limited power of attorney in a jurisdiction.

Referring to FIG. 4, method 400 may include providing 435, by a processor, power of attorney information in relation to the identification information of the account user. In an embodiment, for example, the providing 435 of power of attorney information may be provided in relation to the identification information of the account user by a processor of wireless electronic device 310 (which may be similar to the processing unit 3 of FIG. 1 in embodiments). It will be understood that power of attorney information may be provided by a processor in accordance with applicable law of a jurisdiction determined from the identification information of the account user for informing the account user of the authorization being provided to an attorney-in-fact by grant of the limited power of attorney, for obtaining confirmation of assent to granting the same limited power of attorney, by the account user using the wireless electronic device.

Referring to FIG. 4, method 400 may include providing 440, at the display 315, power of attorney information in relation to the identification information of the account user. In an embodiment, for example, the providing 440 of power of attorney information may be provided in relation to the identification information of the account user at the display 315 of wireless electronic device 310 (shown in FIG. 3). It will be understood that power of attorney information may be provided at the display in accordance with applicable law of a jurisdiction determined from the identification information of the account user for informing the account user of the authorization being provided to an attorney-in-fact by grant of the limited power of attorney, for obtaining confirmation of assent to granting the same limited power of attorney, by the account user using the wireless electronic device.

Referring to FIG. 4, method 400 may include providing 445, at the display 315, a confirmation prompt relating to the power of attorney information. In an embodiment, for example, the providing 445 of a confirmation prompt relating to the power of attorney information may be provided at the display 315 of wireless electronic device 310 (shown in FIG. 3). It will be understood that such a confirmation prompt may be provided for obtaining confirmation of assent to granting the limited power of attorney, by the account user using the wireless electronic device.

Referring to FIG. 4, method 400 may include receiving 450, at an engageable input 318 of the user interface, confirmation input responsive to the confirmation prompt, wherein the confirmation input may relate to authorization of the power of attorney information for the account user. In an embodiment, for example, the receiving 450 of confirmation input responsive to the confirmation prompt and relating to authorization of the power of attorney information for the account user may be received at an engageable input 318 of a user interface 317 of the wireless electronic device 310 (shown in FIG. 3).

Referring to FIG. 4, method 400 may include storing 455, in memory of the system, at least part of each of the following: the confirmation input, the power of attorney information, the identification information, and the execution input. In an embodiment, for example, the storing 455 of at least part of each of the following: the confirmation input, the power of attorney information, the identification information, and the execution input, may be stored in memory of the system 300 (similar to the system memory 4 of FIG. 1 in embodiments). It will be understood that suitable memory may be provided and accessible, for example, in wireless electronic device 310, server 350, in accessible relation to server 350, or in storage accessible via network 360.

Referring to FIG. 4, method 400 may include processing 460, at a processor, the identification information for the account user to obtain state of residence of the account user. In an embodiment, for example, the processing 460 of the identification information for the account user may be processed at a processor of the system 300 (shown in FIG. 3) to obtain state of residence of the account user. It will be understood that a suitable processor may be provided and accessible, for example, in wireless electronic device 310, server 350, in accessible relation to server 350, or in a processor accessible via network 360.

Referring to FIG. 4, method 400 may include processing 465, at a processor, the acceptable execution prompt in relation to state of residence of the account user. In an embodiment, for example, the processing 465 of the acceptable execution prompt may be processed at a processor of the system 300 (which may be similar to the processing unit 3 of FIG. 1 in embodiments) in relation to state of residence of the account user. It will be understood that a suitable processor may be provided and accessible, for example, in wireless electronic device 310, server 350, in accessible relation to server 350, or in a processor accessible via network 360.

Referring to FIG. 4, method 400 may include displaying 470, at the display 315, the acceptable execution prompt in relation to state of residence of the account user. In an embodiment, for example, the displaying 470 of the acceptable execution prompt may be displayed at the display 315 of wireless electronic device 310 of the system 300 (shown in FIG. 3) in relation to the state of residence of the account user.

Referring to FIG. 4, method 400 may include processing 475, at a processor, the power of attorney information for the account user in relation to the state of residence of the account user. In an embodiment, for example, the processing 475 of the power of attorney information may be processed at a processor of the system 300 (shown in FIG. 3) in relation to the state of residence of the account user. It will be understood that a suitable processor may be provided and accessible, for example, in wireless electronic device 310, server 350, in accessible relationship to server 350, or in a processor accessible via network 360.

Referring to FIG. 4, method 400 may include displaying 480, at the display, the power of attorney information in relation to state of residence of the account user. In an embodiment, for example, displaying 480 of the power of attorney information may be displayed at the display 315 of wireless electronic device 310 of the system 300 (shown in FIG. 3) in relation to state of residence of the account user.

Illustrated in FIG. 3 is a system 300 according to an embodiment. System 300 may include a processor (similar to processing unit 3 of FIG. 1 in embodiments). It will be understood that the processor may be located in, and may form part of, wireless electronic device 310 or server 350. System 300 may include memory (similar to system memory 4 of FIG. 1 in embodiments) coupled to the processor 350 to store information related to account identifier information, identification information, execution input information, and power of attorney information. It will be understood that memory of system 300 may be located in, and may form part of, wireless electronic device 310 or server 350. System 300 may include wireless electronic device 310 such as, for example, a mobile phone, cell phone, wireless phone, smartphone, wireless enabled device, or tablet computer. As shown in FIG. 3, wireless electronic device 310 may include a display 315, a user interface 317 including one or more engageable inputs 318, processor, memory, and a communications interface suitable for communications across a wireless communication network 320. System 300 may include a server 350 having a suitable processor and memory. System 300 may include financial institution computing resources in communication with network 360.

Referring to FIG. 3, system 300 may include a legal document module operably coupled with the processor, memory, and wireless electronic device 310. In an embodiment, the legal document module may be stored in a database.

Referring to FIG. 3, system 300 may include a power of attorney module operably coupled with the processor, memory, and wireless electronic device 310. In an embodiment, the power of attorney module may be stored in a database.

In the embodiment shown in FIG. 3, the power of attorney module may be operable to provide 405, at a display 315 of wireless electronic device 310, an account identifier prompt 530 relating to an account identifier. It will be understood that wireless electronic device 310 may be configured as shown, more particularly, in FIG. 5. In embodiments, display 315 may include a wireless electronic device 310. In the embodiment shown in FIG. 3, the power of attorney module may be operable to receive 410 the account identifier via an engageable input 318 of a user interface 317 of the wireless electronic device 310.

In the embodiment shown in FIG. 3, the power of attorney module may be operable to receive 415, at the wireless electronic device 310, identification information for an account user. In an embodiment, the identification information may comprise government accepted identification (such as driver's license, passport, id card, etc.) information of the account user. In an embodiment, the identification information may comprise identification information of the account user, wherein the identification information may be obtained from an image of a portion of a government accepted identification of the account user. In an embodiment, the identification information may comprise identification information of the account user, wherein the identification information may be obtained from a scan of a unique identifier of a government accepted identification of the account user. In an embodiment, the identification information may comprise identification information of the account user, wherein the identification information may be obtained from a scan of a unique barcode of a government accepted identification of the account user.

In the embodiment shown in FIG. 3, the power of attorney module may be operable to provide 420, at the display 315 of wireless electronic device 310, an execution prompt relating to acceptable execution input. In an embodiment, for example, the acceptable execution input may relate to a state specific requirement for execution of a power of attorney. In an embodiment, for example, the acceptable execution input may be responsive to a state specific requirement for execution of a power of attorney. In an embodiment, for example, the acceptable execution input may include witness information. In an embodiment, for example, the acceptable execution input may comprise an image of a witness, wherein the image may be acquired by a camera element of the wireless electronic device 310. In an embodiment, for example, the acceptable execution input may comprise an image of the account user, wherein the image may be acquired by a camera element of the wireless electronic device 310. In an embodiment, for example, the acceptable execution input may comprise an image of the account user and witness, wherein the image may be acquired by a camera element of the wireless electronic device 310. In an embodiment, for example, the acceptable execution input may comprise government accepted identification (such as driver's license, passport, id card, etc.) information of a witness. In an embodiment, for example, the acceptable execution input may comprise identification information of a witness, wherein the identification information may be obtained from an image of a portion of a government accepted identification of the witness. In an embodiment, for example, the acceptable execution input may comprise identification information of a witness, wherein the identification information may be obtained from a scan of a unique identifier contained on the mobile device or a government accepted identification of the witness. In an embodiment, for example, the acceptable execution input may comprise identification information of the witness, wherein the identification information may be obtained from a scan of a unique barcode contained on the mobile device or a government accepted identification of the witness.

In embodiments, the acceptable execution input (such as, but not limited to witness information) may be transferred from a witness's wireless electronic device to server 350 using any appropriate means to transfer the data. In embodiments, the acceptable execution input may be routed to an account user's wireless electronic device from server 350. For example, an image of a witness may be sent from a witness's wireless electronic device to server 350. The server may then route the image to an account user's wireless electronic device.

In the embodiment shown in FIG. 3, the power of attorney module may be operable to receive 425, via the engageable input 318 of the user interface 317 of wireless electronic device 310, execution input responsive to the execution prompt. In an embodiment, for example, the execution input may relate to a state specific requirement for execution of a power of attorney. In an embodiment, for example, the execution input may be responsive to a state specific requirement for execution of a power of attorney. In an embodiment, for example, the execution input may include witness information. In an embodiment, for example, the execution input may comprise an image of a witness, wherein the image may be acquired by a camera element of the wireless electronic device 310. In an embodiment, for example, the execution input may comprise an image of the account user, wherein the image may be acquired by a camera element of the wireless electronic device 310. In an embodiment, for example, the execution input may comprise an image of the account user and witness, wherein the image may be acquired by a camera element of the wireless electronic device 310. In an embodiment, for example, the execution input may comprise government accepted identification (such as driver's license, passport, id card, etc.) information of a witness. In an embodiment, for example, the execution input may comprise identification information of a witness, wherein the identification information may be obtained from an image of a portion of a government accepted identification of the witness. In an embodiment, for example, the execution input may comprise identification information of a witness, wherein the identification information may be obtained from a scan of a unique identifier contained on the mobile device or a government accepted identification of the witness. In an embodiment, for example, the execution input may comprise identification information of the witness, wherein the identification information may be obtained from a scan of a unique barcode contained on the mobile device or a government accepted identification of the witness.

In embodiments, the acceptable execution input (such as, but not limited to witness information) may be transferred from a witness's wireless electronic device to server 350 using any appropriate means to transfer the data. In embodiments, the acceptable execution input may be routed to an account user's wireless electronic device from server 350. For example, an image of a witness may be sent from a witness's wireless electronic device to server 350. The server may then route the image to an account user's wireless electronic device.

In the embodiment shown in FIG. 3, the power of attorney module may be operable to validate 430, by a processor (similar to processing unit 3 of FIG. 1 in embodiments), the execution input in relation to the acceptable execution input. In an embodiment, for example, the execution input may be validated in relation to the acceptable execution input by a processor of system 300 such as the processor of the wireless electronic device 310 (which may be similar to the processing unit 3 of FIG. 1 in embodiments) or server 350 of system 300. In an embodiment, for example, the power of attorney module may be operable to validate age of a witness.

In the embodiment shown in FIG. 3, the power of attorney module may be operable to provide 435, by a processor, power of attorney information in relation to the identification information of the account user.

In the embodiment shown in FIG. 3, the power of attorney module may be operable to provide 440, at the display 315 of wireless electronic device 310, the power of attorney information.

In the embodiment shown in FIG. 3, the power of attorney module may be operable to provide 445, at the display 315, a confirmation prompt relating to the power of attorney information.

In the embodiment shown in FIG. 3, the power of attorney module may be operable to receive 450, via the engageable input 318 of the user interface 317, confirmation input responsive to the confirmation prompt, wherein the confirmation input may relate to authorization of the power of attorney information for the account user.

Figure 6:
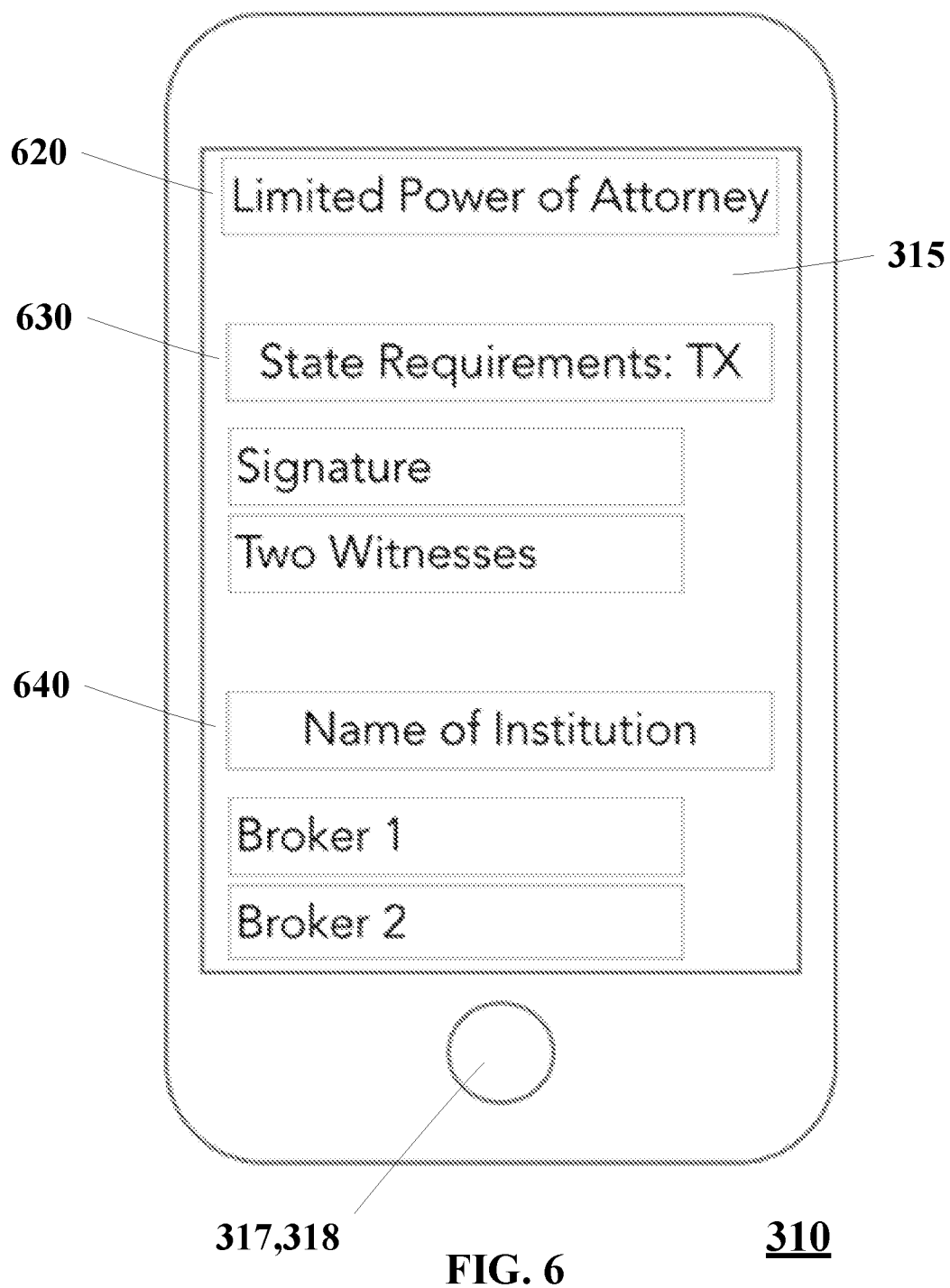
FIG. 6 is a partial front perspective view similar to FIG. 5, showing a display in accordance with additional aspects of disclosed subject matter.

FIG. 6 is a partial front perspective view similar to FIG. 5, showing a display 315 in accordance with additional aspects of disclosed subject matter. A Power of Attorney (POA) title prompt 620 may be displayed at an upper area of the wireless electronic device 310, which may hint at what the display 315 is displaying at a specific time or what the display 315 may be capable of displaying. A state requirement prompt 630 may display information on the display 315 such as, but not limited to power of attorney state requirements for one or more states. In embodiments, at least part of the state requirement prompt may be an engageable selection prompt that may allow a user to pick a state and in response, the wireless electronic device 310 may display power of attorney state requirements for one or more states. A POA institution prompt 640 may identify one or more institutions of accounts of a user that may be associated with a limited power of attorney according to a user of the wireless electronic device 310.

Figure 7:
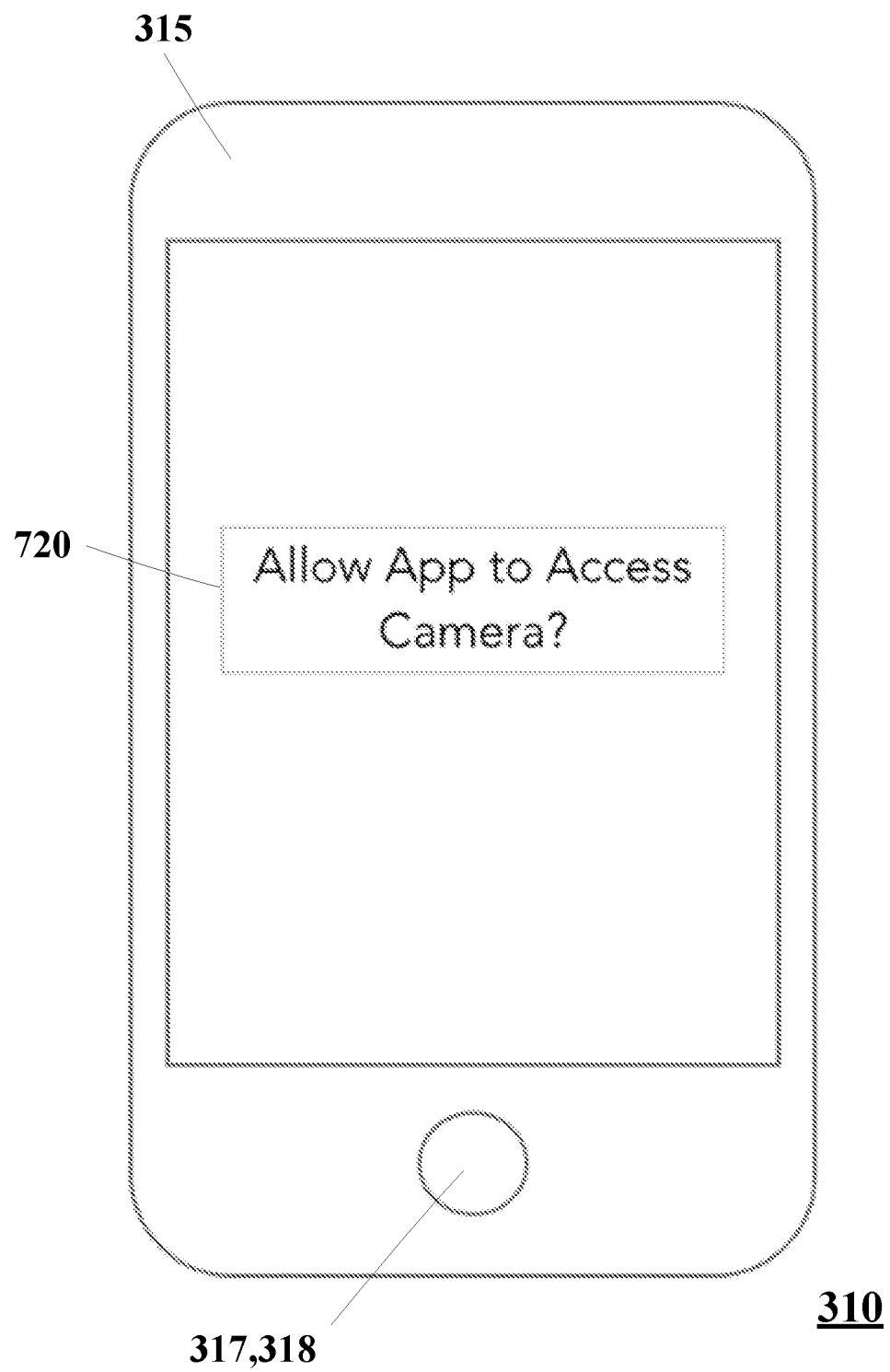
FIG. 7 is a partial front perspective view similar to FIG. 5, showing a display in accordance with additional aspects of disclosed subject matter.

FIG. 7 is a partial front perspective view similar to FIG. 5, showing a display 315 in accordance with additional aspects of disclosed subject matter. A camera query prompt 720 may be displayed by the wireless electronic device 310, which may allow an application to directly access a camera of the wireless electronic device 310. In embodiments, the camera may be used to capture an image of a government accepted identification (such as driver's license, passport, id card, etc.). In embodiments, the camera may be used to capture an image of an individual.

Figure 8:
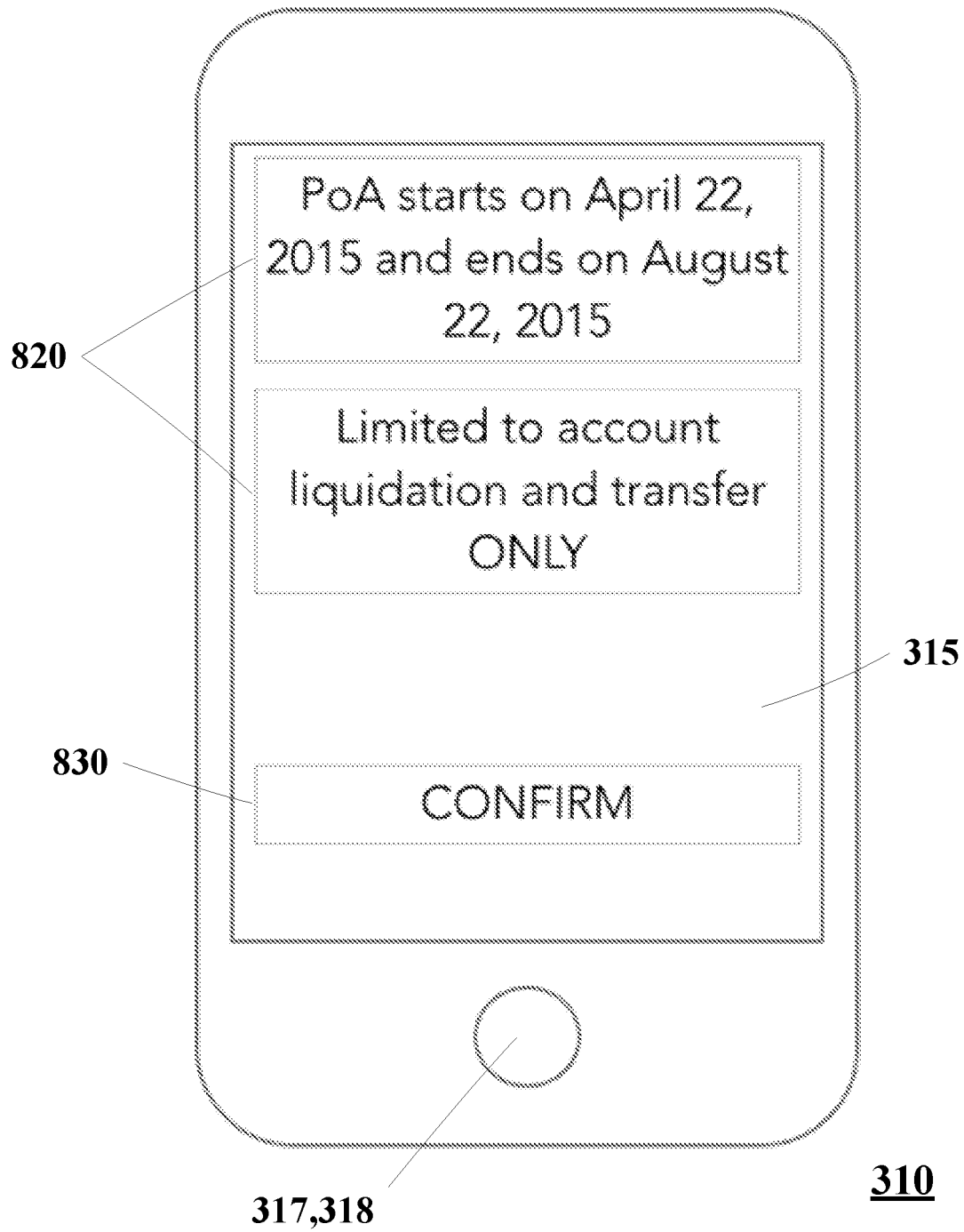
FIG. 8 is a partial front perspective view similar to FIG. 5, showing a display in accordance with additional aspects of disclosed subject matter.

FIG. 8 is a partial front perspective view similar to FIG. 5, showing a display 315 in accordance with additional aspects of disclosed subject matter. POA information prompts 820 may be displayed on a display 315 of a wireless electronic device 310. In embodiments, a POA information prompt 820 may state the time period in which a limited power of attorney may last or any other information associated with the legal instrument being created and populated. In embodiments, a POA information prompt 820 may state what a limited power of attorney may be limited to (such as, for example, account liquidation and/or transfer). A confirmation prompt 830 may be displayed on the display 315 of a wireless electronic device 310. The confirmation prompt 830 may allow a user to confirm that they agree with the information stated in the POA information prompts 820. FIG. 8 depicts, generally, the manner in which information may be displayed on remote electronic devices in order for it to be provided to, and confirmed by (such as by a confirmation input 830) the parties to the execution.

The disclosed subject matter may provide an article of manufacture. In embodiments, the article of manufacture may comprise at least one non-transitory data storage device having one or more computer programs stored thereon and may be operable on one or more computing systems (such as, for example, computing system 1) to carry out one or more steps of the aforementioned method.

In embodiments, the article of manufacture may be operable on a computing system to provide 405, at a display 315 of a wireless electronic device 310, an account identifier prompt 530 relating to an account identifier. It will be understood that the providing may be performed by any suitable wireless electronic device, such as a wireless electronic device 310 of system 300. For example, a suitable wireless electronic device 310 may have a display 315 configured to provide an account identifier prompt 530 relating to an account identifier. It will be understood that in the providing 405, an account identifier prompt 530 may by displayed to request that a user of the wireless electronic device 310 input an account identifier into system 300 by entering via a user interface 317 of wireless electronic device 310 an account user's account identification information of an account existing with a third party account provider. One of ordinary skill will understand that an account identifier, for example, may include identifying information for an account of an account user, such as an individual, with a third party account provider, such as a financial institution. Referring to FIG. 5, it will be understood that an account may be, for example, a financial account such as, without limitation, an Individual Retirement Account (IRA), brokerage account, 401(k) account, or custodial account (such as, for example, a Uniform Grants to Minors Account (UTMA) or Uniform Gift to Minors Account (UGMA)). It will be understood that any suitable financial account or asset account may be the subject of method 400.

In embodiments, the article of manufacture may be operable on a computing system to receive 410, at an engageable input 318 of a user interface 317 of the wireless electronic device 310, the account identifier. In an embodiment, for example, the receiving 410 of such an account identifier may be received at an engageable input 318 of a user interface 317 of the wireless electronic device 310 (shown in FIG. 3).

In embodiments, the article of manufacture may be operable on a computing system to receive, at the wireless electronic device, identification information of an account user. In an embodiment, for example, the identification information of an account user may be received 415 at an engageable input 318 of a user interface 317 of the wireless electronic device 310 (shown in FIG. 3). In an embodiment, the receiving 415 of the identification information may comprise government accepted identification (such as driver's license, passport, id card, etc.) information of the account user. In an embodiment, the receiving 415 of the identification information may comprise identification information of the account user, wherein the identification information may be obtained from an image of a portion of a government accepted identification of the account user. In an embodiment, the receiving 415 of the identification information may comprise identification information of the account user, wherein the identification information may be obtained from a scan of a unique identifier of a government accepted identification of the account user. In an embodiment, the receiving 415 of the identification information may identification information of the account user, wherein the identification information may be obtained from a scan of a unique barcode of the government accepted identification of the account user.

In embodiments, the article of manufacture may be operable on a computing system to provide 420, at the display, an execution prompt relating to acceptable execution input. In an embodiment, for example, the providing 420 of execution input responsive to the execution prompt may be provided at display 315 of wireless electronic device 310 (shown in FIG. 3). In an embodiment, for example, the providing 420 of the acceptable execution input may relate to a state specific requirement for execution of a power of attorney. In an embodiment, for example, the providing 420 of the acceptable execution input may be responsive to a state specific requirement for execution of a power of attorney. In an embodiment, for example, the providing 420 of the acceptable execution input may include witness information. In an embodiment, for example, the providing 420 of the acceptable execution input may comprise an image of a witness, wherein the image may be acquired by a camera element of the wireless electronic device 310. In an embodiment, for example, the providing 420 of the acceptable execution input may comprise an image of the account user, wherein the image may be acquired by a camera element of the wireless electronic device 310. In an embodiment, for example, the providing 420 of the acceptable execution input may comprise an image of the account user and witness, wherein the image may be acquired by a camera element of the wireless electronic device 310. In an embodiment, for example, the providing 420 of the acceptable execution input may comprise government accepted identification (such as driver's license, passport, id card, etc.) information of a witness. In an embodiment, for example, the providing 420 of the acceptable execution input may comprise identification information of a witness, wherein the identification information may be obtained from an image of a portion of a government accepted identification of the witness. In an embodiment, for example, the providing 420 of the acceptable execution input may comprise identification information of a witness, wherein the identification information may be obtained from a scan of a unique identifier contained on the mobile device or a government accepted identification of the witness. In an embodiment, for example, the providing 420 of the acceptable execution input may comprise identification information of the witness, wherein the identification information may be obtained from a scan of a unique barcode contained on the mobile device or a government accepted identification of the witness.

In embodiments, the acceptable execution input (such as, but not limited to witness information) may be transferred from a witness's wireless electronic device to server 350 using any appropriate means to transfer the data. In embodiments, the acceptable execution input may be routed to an account user's wireless electronic device from server 350. For example, an image of a witness may be sent from a witness's wireless electronic device to server 350. The server may then route the image to an account user's wireless electronic device.

In embodiments, the article of manufacture may be operable on a computing system to receive 425, at an engageable input 318 of the user interface 317, execution input responsive to the execution prompt. In an embodiment, for example, the receiving 425 of execution input responsive to the execution prompt may be received at an engageable input 318 of a user interface 317 of the wireless electronic device 310 (shown in FIG. 3). In an embodiment, for example, the receiving 425 of the execution input may relate to a state specific requirement for execution of a power of attorney. In an embodiment, for example, the receiving 425 of the execution input may be responsive to a state specific requirement for execution of a power of attorney. In an embodiment, for example, the receiving 425 of the execution input may include witness information. In an embodiment, for example, the receiving 425 of the execution input may comprise an image of a witness, wherein the image may be acquired by a camera element of the wireless electronic device 310. In an embodiment, for example, the receiving 425 of the execution input may comprise an image of the account user, wherein the image may be acquired by a camera element of the wireless electronic device 310. In an embodiment, for example, the receiving 425 of the execution input may comprise an image of the account user and witness, wherein the image may be acquired by a camera element of the wireless electronic device 310. In an embodiment, for example, the receiving 425 of the execution input may comprise government accepted identification (such as driver's license, passport, id card, etc.) information of a witness. In an embodiment, for example, the receiving 425 of the execution input may comprise identification information of a witness, wherein the identification information may be obtained from an image of a portion of a government accepted identification of the witness. In an embodiment, for example, the receiving 425 of the execution input may comprise identification information of a witness, wherein the identification information may be obtained from a scan of a unique identifier contained on the mobile device or a government accepted identification of the witness. In an embodiment, for example, the receiving 425 of the execution input may comprise identification information of the witness, wherein the identification information may be obtained from a scan of a unique barcode contained on the mobile device or a government accepted identification of the witness.

In embodiments, the acceptable execution input (such as, but not limited to witness information) may be transferred from a witness's wireless electronic device to server 350 using any appropriate means to transfer the data. In embodiments, the acceptable execution input may be routed to an account user's wireless electronic device from server 350. For example, an image of a witness may be sent from a witness's wireless electronic device to server 350. The server may then route the image to an account user's wireless electronic device.

In embodiments, the article of manufacture may be operable on a computing system to validate 430, by a processor, the execution input in relation to the acceptable execution input. In an embodiment, for example, the validating 430 of the execution input may be validated in relation to the acceptable execution input by a processor of system 300 such as the processor of the wireless electronic device 310 (which may be similar to the processing unit 3 of FIG. 1 in embodiments) or server 350 of system 300. In an embodiment, for example, the validating 430 may further comprise validating age of a witness.

In embodiments, the article of manufacture may be operable on a computing system to provide 435, by a processor, power of attorney information in relation to the identification information of the account user. In an embodiment, for example, the providing 435 of power of attorney information may be provided in relation to the identification information of the account user by a processor of wireless electronic device 310 (which may be similar to the processing unit 3 of FIG. 1 in embodiments).

In embodiments, the article of manufacture may be operable on a computing system to provide 440, at the display 315, power of attorney information in relation to the identification information of the account user. In an embodiment, for example, the providing 440 of power of attorney information may be provided in relation to the identification information of the account user at the display 315 of wireless electronic device 310 (shown in FIG. 3).

In embodiments, the article of manufacture may be operable on a computing system to provide 445, at the display 315, a confirmation prompt relating to the power of attorney information. In an embodiment, for example, the providing 445 of a confirmation prompt relating to the power of attorney information may be provided at the display 315 of wireless electronic device 310 (shown in FIG. 3).

In embodiments, the article of manufacture may be operable on a computing system to receive 450, at an engageable input 318 of the user interface 317, confirmation input responsive to the confirmation prompt, the confirmation input relating to authorization of the power of attorney information for the account user. In an embodiment, for example, the receiving 450 confirmation input may be responsive to the confirmation prompt and relating to authorization of the power of attorney information for the account user may be received at an engageable input 318 of a user interface 317 of the wireless electronic device 310 (shown in FIG. 3).

In embodiments, the article of manufacture may be operable on a computing system to store 455, in memory of the system, at least part of each of the following: the confirmation input, the power of attorney information, the identification information, and the execution input. In an embodiment, for example, the storing 455 of at least part of each of the following may occur: the confirmation input, the power of attorney information, the identification information, and the execution input, may be stored in memory of the system 300 (similar to the system memory 4 of FIG. 1 in embodiments). It will be understood that suitable memory may be provided and accessible, for example, in wireless electronic device 310, server 350, in accessible relation to server 350, or in storage accessible via network 360.

In embodiments, the article of manufacture may be operable on a computing system to process 460, at a processor, the identification information for the account user to obtain state of residence of the account user. In an embodiment, for example, the processing 460 of the identification information for the account user may be processed at a processor of the system 300 (which may be similar to the processing unit 3 of FIG. 1 in embodiments) to obtain state of residence of the account user. It will be understood that a suitable processor may be provided and accessible, for example, in wireless electronic device 310, server 350, in accessible relation to server 350, or in a processor accessible via network 360.

In embodiments, the article of manufacture may be operable on a computing system to process 465, at a processor, the acceptable execution prompt in relation to state of residence of the account user. In an embodiment, for example, the processing 465 of the acceptable execution prompt may be processed at a processor of the system 300 (which may be similar to the processing unit 3 of FIG. 1 in embodiments) in relation to state of residence of the account user. It will be understood that a suitable processor may be provided and accessible, for example, in wireless electronic device 310, server 350, in accessible relation to server 350, or in a processor accessible via network 360.

In embodiments, the article of manufacture may be operable on a computing system to display 470, at the display 315, the acceptable execution prompt in relation to state of residence of the account user. In an embodiment, for example, the displaying 470 of the acceptable execution prompt may be displayed at the display 315 of wireless electronic device 310 of the system 300 (shown in FIG. 3) in relation to state of residence of the account user.

In embodiments, the article of manufacture may be operable on a computing system to process 475, at a processor, the power of attorney information for the account user in relation to state of residence of the account user. In an embodiment, for example, the processing 475 of the power of attorney information may be processed at a processor of the system 300 (shown in FIG. 3) in relation to state of residence of the account user. It will be understood that a suitable processor may be provided and accessible, for example, in wireless electronic device 310, server 350, in accessible relationship to server 350, or in a processor accessible via network 360.

In embodiments, the article of manufacture may be operable on a computing system to display 480, at the display, the power of attorney information in relation to state of residence of the account user. In an embodiment, for example, the processing 475 of the power of attorney information may be displayed 480 at the display 315 of wireless electronic device 310 of the system 300 (shown in FIG. 3) in relation to state of residence of the account user.

In the embodiment shown in FIG. 3, the power of attorney module may be operable to store, in memory of the system 300, at least part of each of the following: confirmation input, power of attorney information, identification information, and execution input.

In embodiments, system 300 of FIG. 3 may include internet 330 that may allow for the exchange of information between components in system 300. In embodiments, system 300 may further include one or more computing systems 370 that may perform one or more tasks that computing system 1 may perform and may perform tasks that computing system 1 may not perform. In embodiments, the server 350 may be connected to the internet 330 via a wired connection 340. In embodiments, wired connection 340 may be a wireless connection.

In embodiments, a limited power of attorney, such as the one described in the aforementioned paragraphs, may be applied to any need or scenario that a traditional power of attorney may be applied to.

In embodiments, the disclosure may provide a method for providing, to an agent, a limited power of attorney. In embodiments, the method for providing, to an agent, a limited power of attorney may be carried out on a single wireless electronic device. In embodiments, any deviations of any methods disclosed in this disclosure may be implemented via a single wireless electronic device.

Referring to FIG. 4, in embodiments, method 400 may further comprise recording 485, via a requesting party, a power of attorney. In embodiments, the power of attorney may be sent to the requesting party via a network.

Referring to FIGS. 3, 5, 6, 7 and 8, for the purposes of this disclosure, the terms "user interface 117" and "GUI 60" may be synonymous.

In embodiments, the power of attorney module and/or the legal document module may be synonymous with remote application programs 40. In embodiments, the power of attorney module and/or the legal document module may exist partially or wholly within server 350, wireless electronic device 310, computing system 370, and/or computing system 1.

For the purposes of this disclosure, the term "processor" not denoted with a numeral may be similar to the processing system 3 of FIG. 1 in embodiments.

Figure 9:
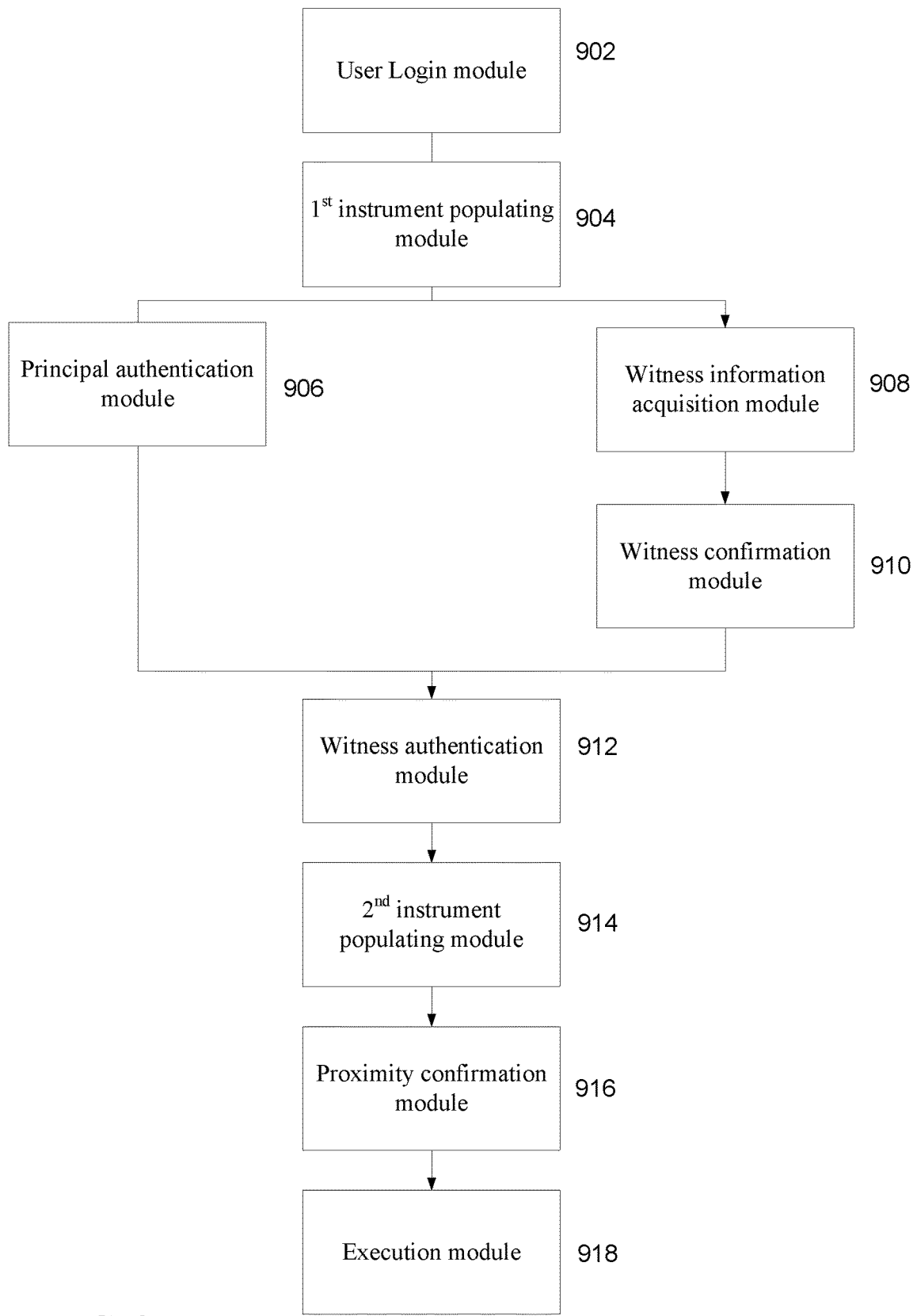
FIG. 9 is an exemplary server system module listing in accordance with embodiments disclosed herein.

In reference to FIG. 9, a system for electronically providing a legal instrument may comprise a plurality of modules comprising computer executable code configured to perform specific tasks. Such a system may comprise a user login module 902 which may allow a principal to login to and thereby access information stored in a server. An instrument populating module 904 may be used to populate a requested legal instrument, and may place into that instrument information associated with the user account. A principal authentication module 906 may be used to request, store, and authenticate information associated with the identity of a principal. A witness information acquisition module 908 may request and store witness contact and identity information from a principal. A witness confirmation module 910 may be used to transmit a request for participation to a witness and request a confirmation that the witness is willing to participate in the activity. A witness authentication module 912 may be used to request, store, and authenticate information associated with the identity of a witness. A second instrument populating module 914 may be used to populate the legal instrument with information associated with a witness, and to confirm that such information is accurate. A proximity confirmation module 916 may be used to request, store, and authenticate location information from both a principal and a witness in order to determine that the witness and principal are co-located at a specific time. Finally, an execution module 918 may allow for the execution of the legal instrument by both the principal and the witness.

Figure 10:
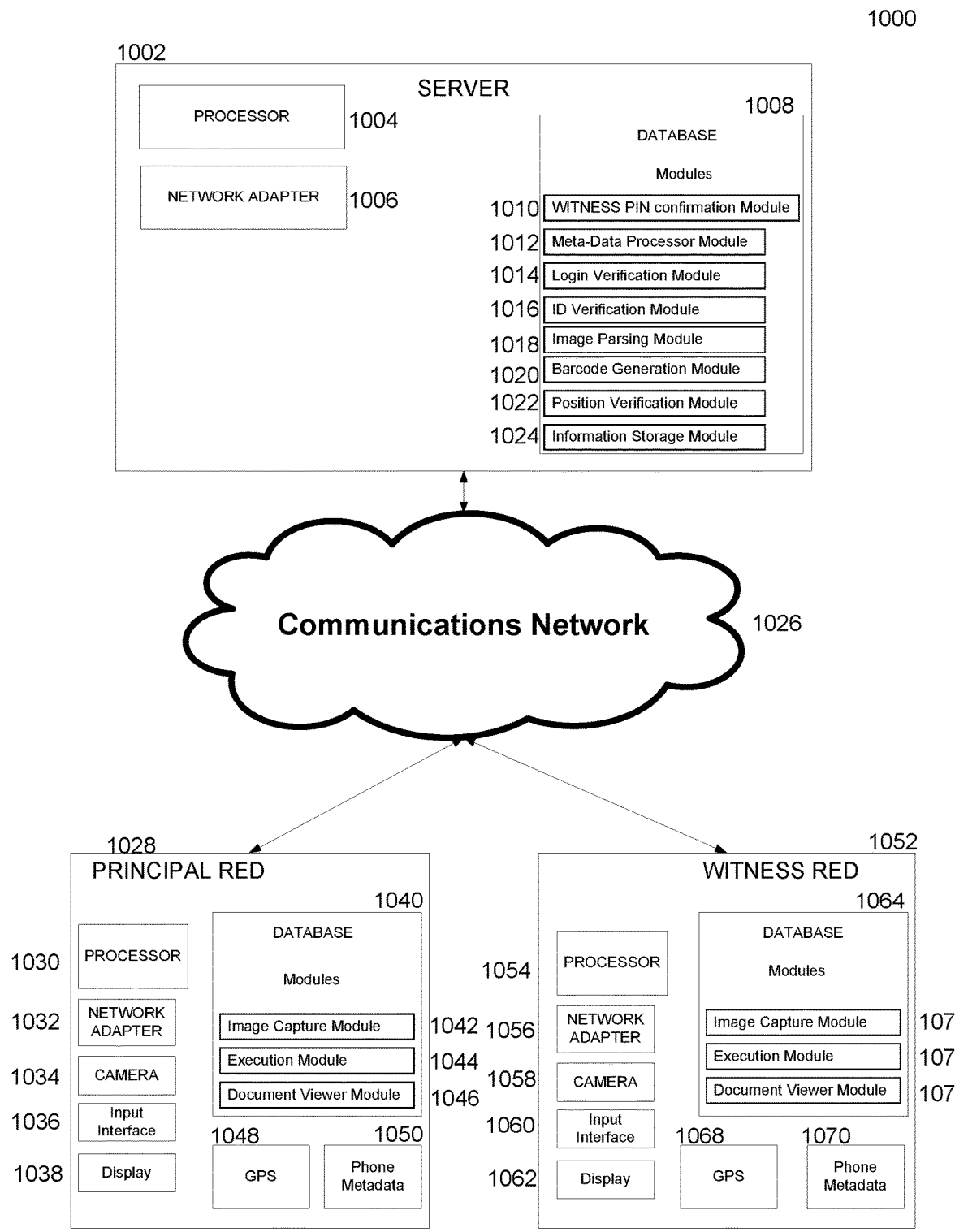
FIG. 10 is an exemplary diagram of a system for electronically providing a legal instrument, including the server, and a plurality of remote electronic devices, in accordance with embodiments.
Figure 11:
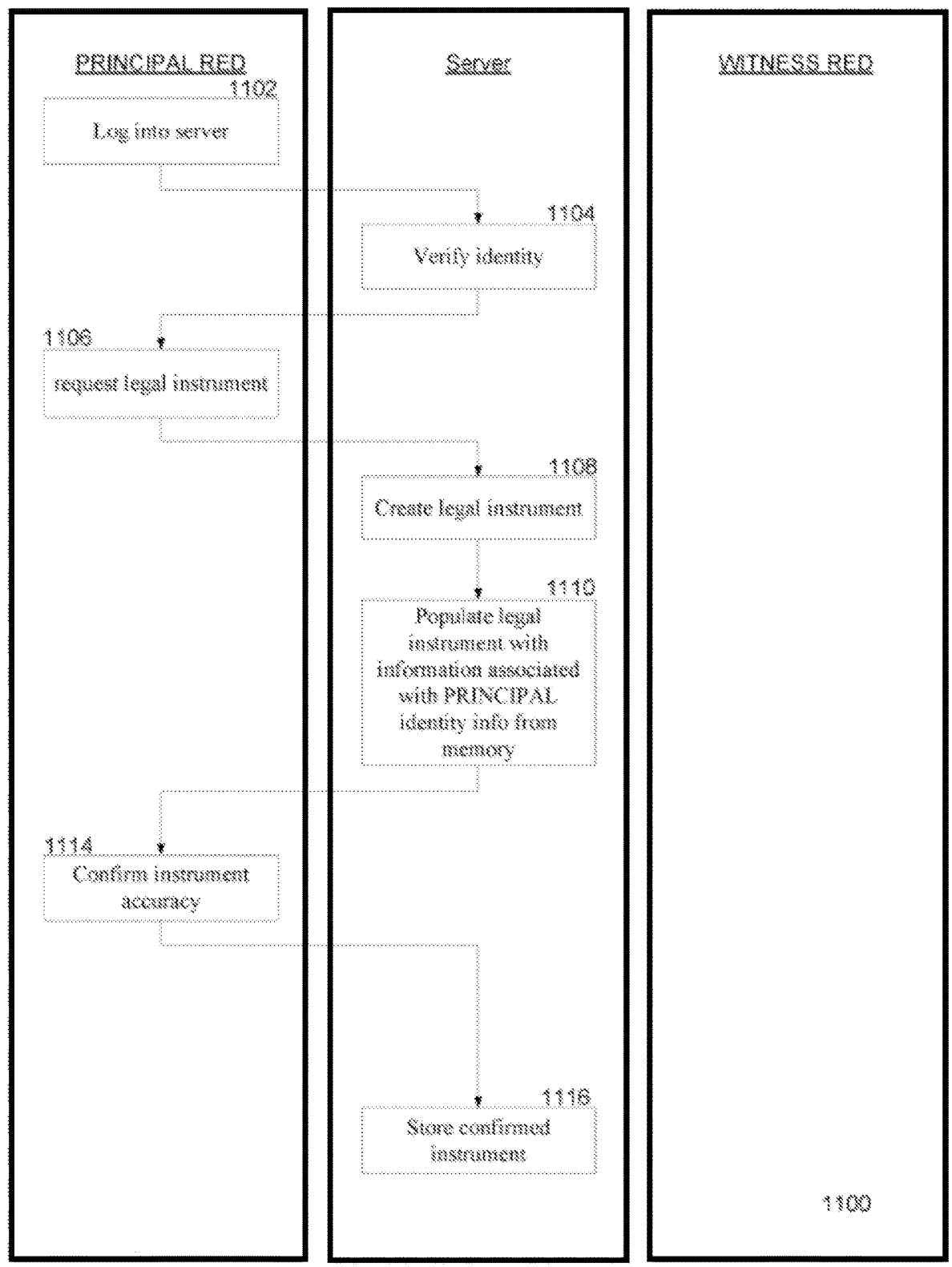
FIG. 11 depicts an exemplary partial flow diagram for a method of electronically providing a legal instrument showing steps for account login and population of an instrument.
Figure 12:
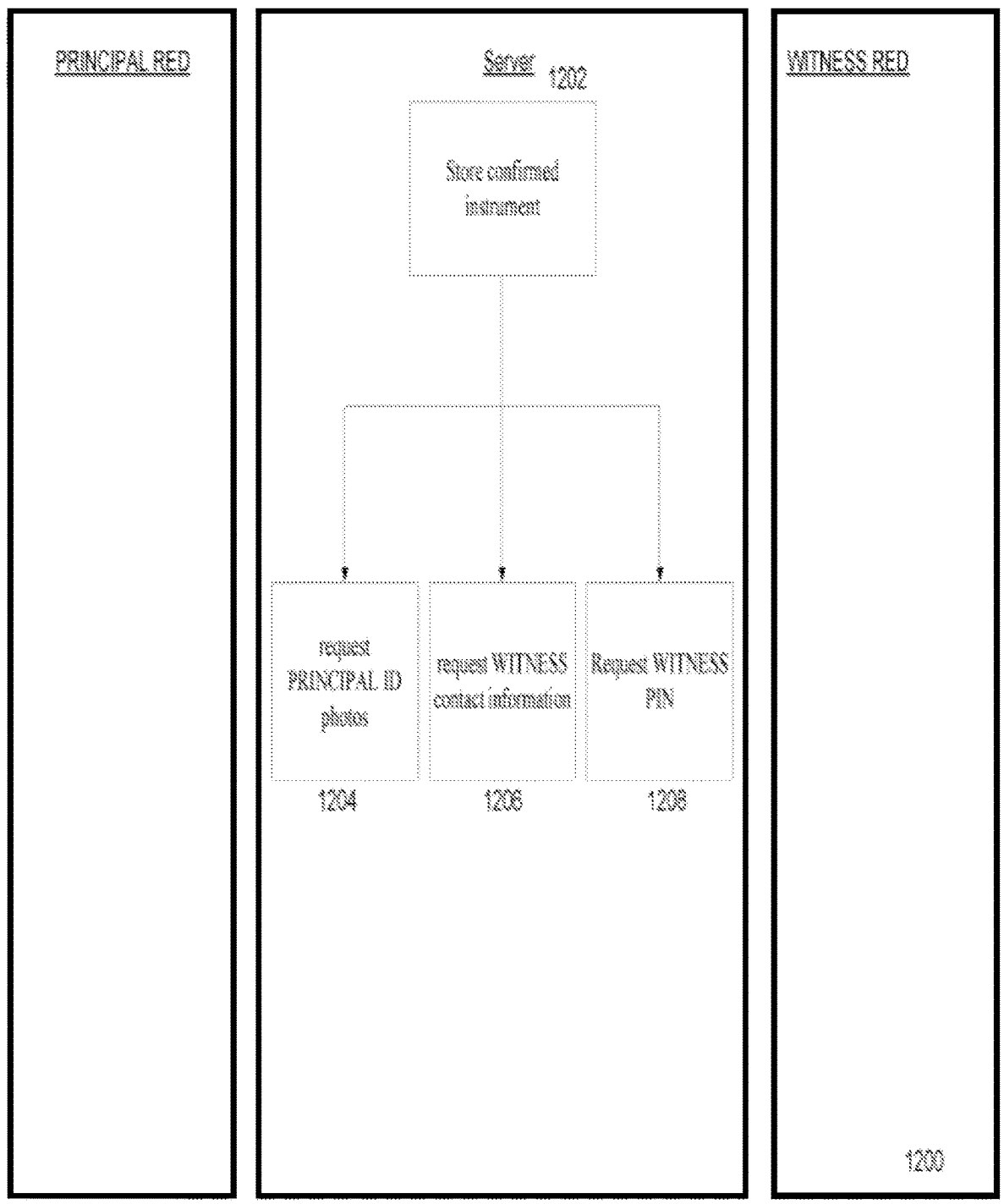
FIG. 12 depicts an exemplary partial flow diagram for a method of electronically providing a legal instrument.
Figure 13:
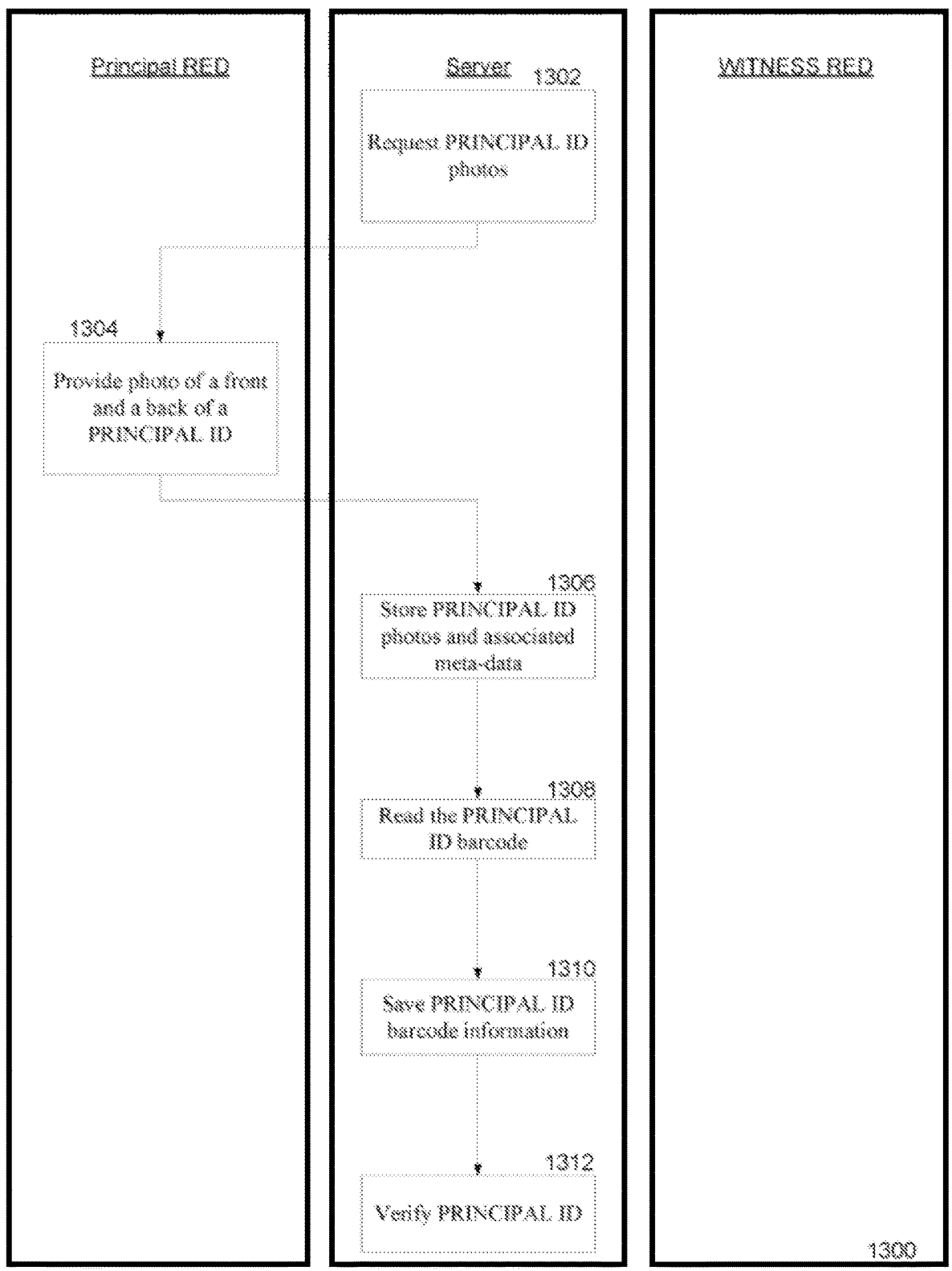
FIG. 13 depicts an exemplary partial flow diagram for a method of electronically providing a legal instrument.
Figure 14:
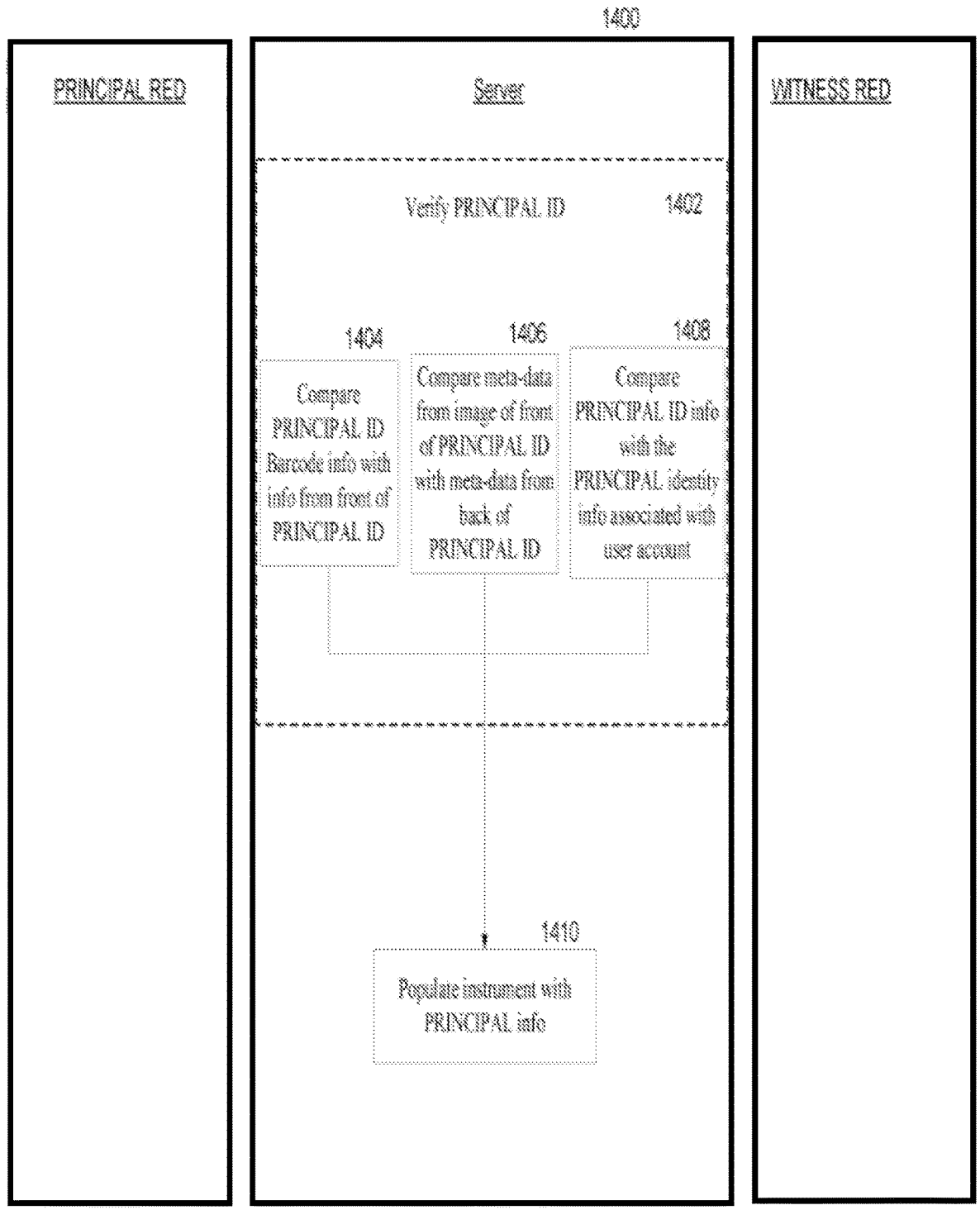
FIG. 14 depicts an exemplary partial flow diagram for a method of electronically providing a legal instrument
Figure 15:
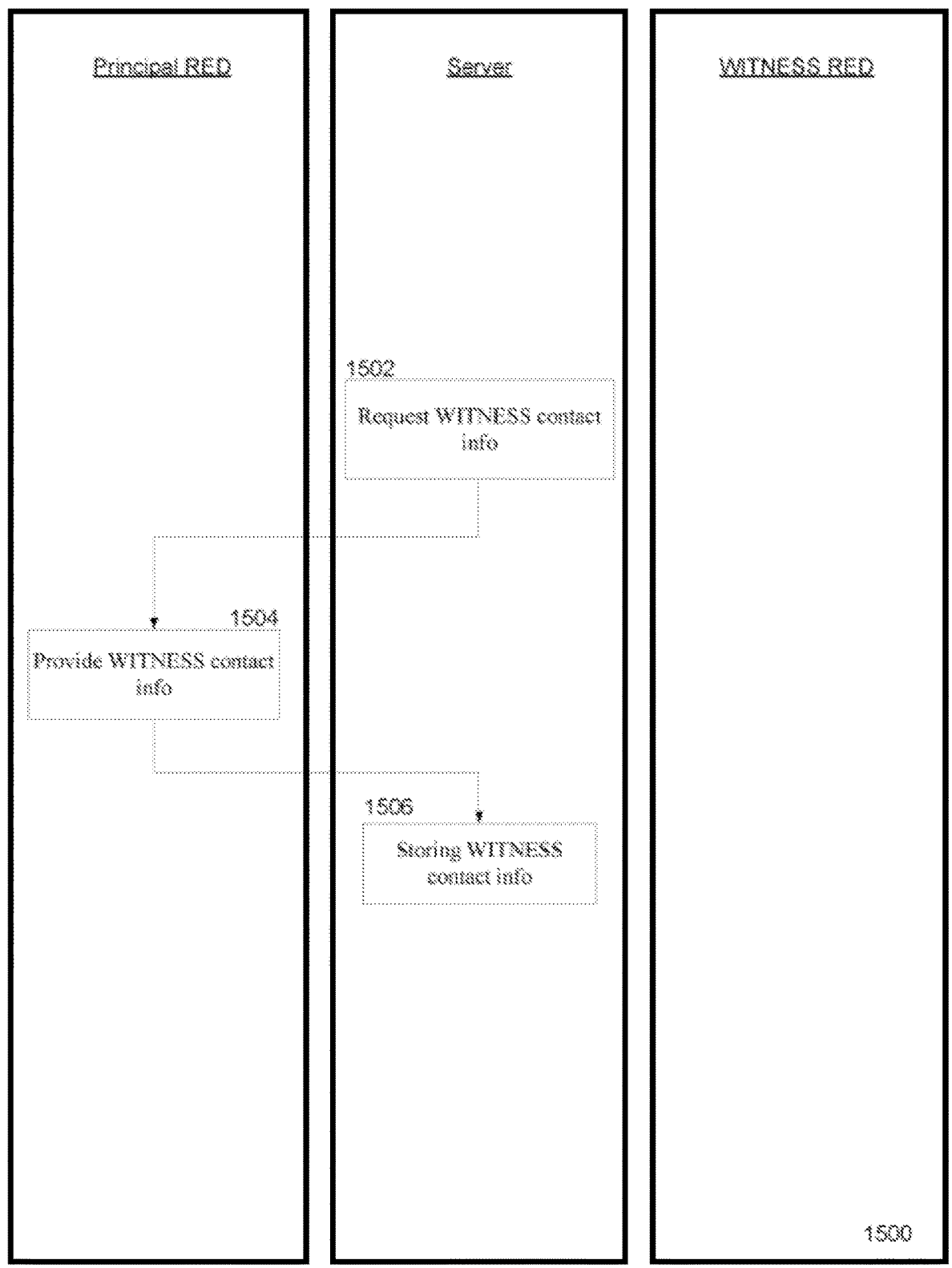
FIG. 15 depicts an exemplary partial flow diagram for a method of electronically providing a legal instrument
Figure 16:
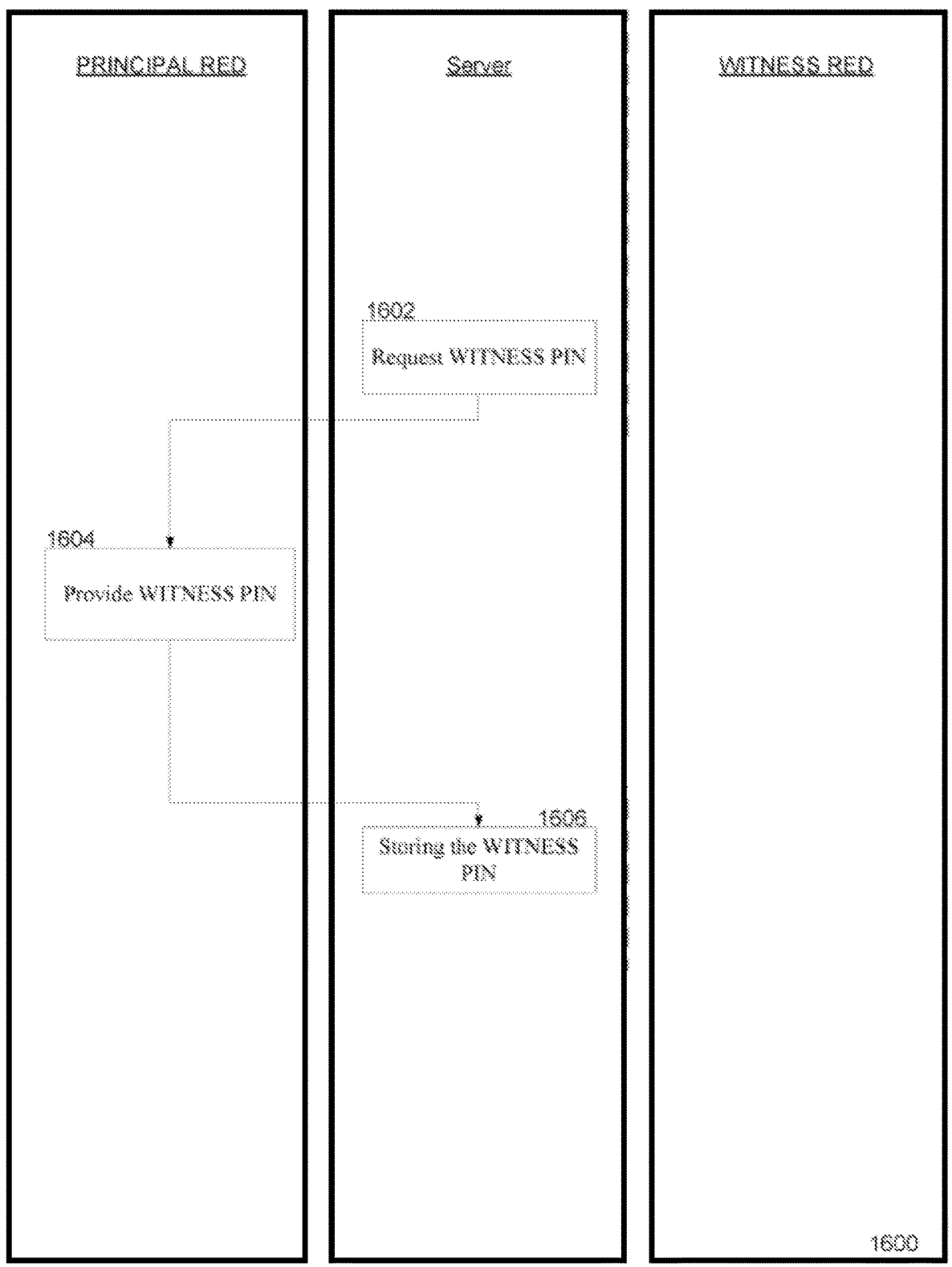
FIG. 16 depicts an exemplary partial flow diagram for a method of electronically providing a legal instrument
Figure 17:
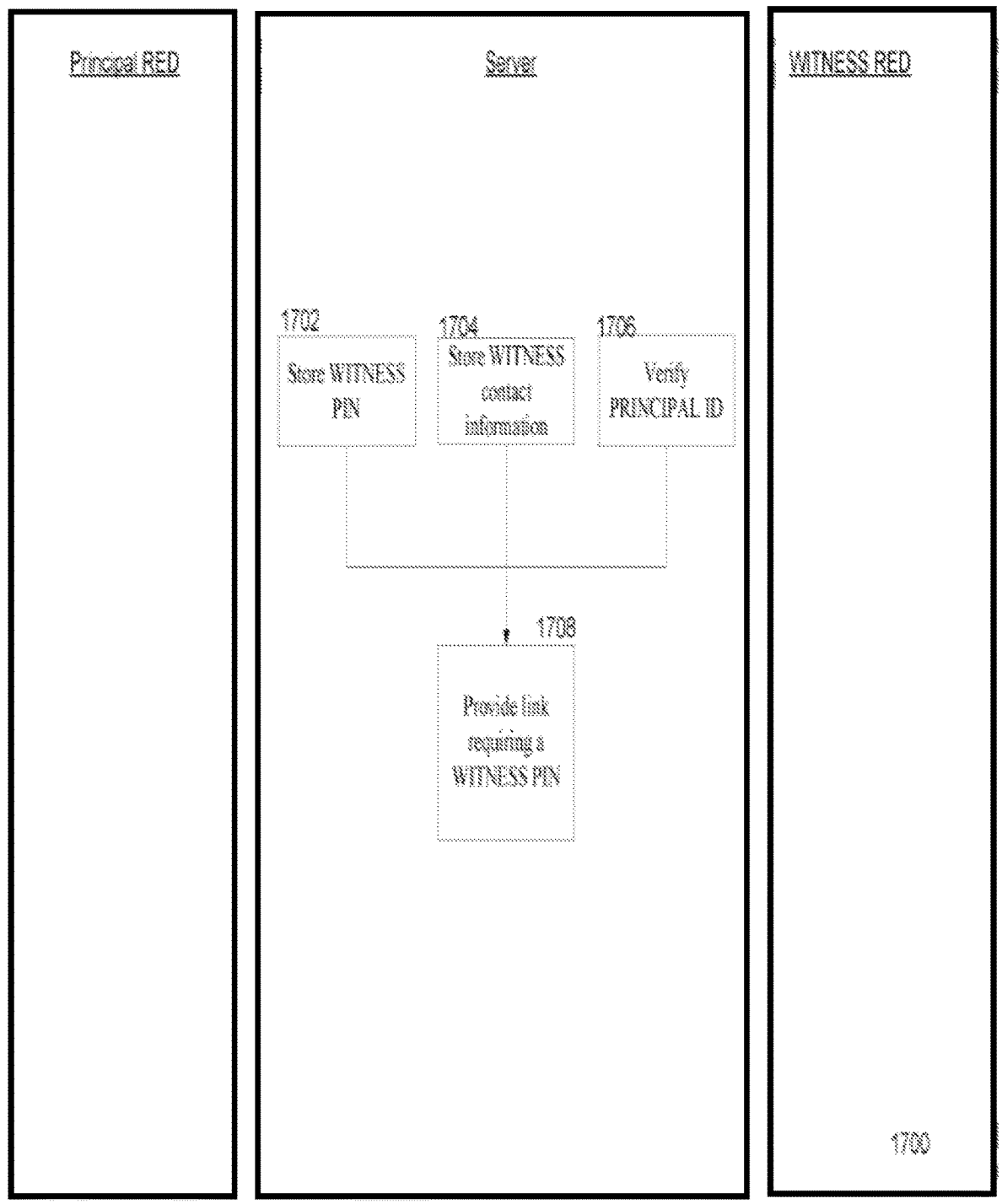
FIG. 17 depicts an exemplary partial flow diagram for a method of electronically providing a legal instrument
Figure 18:
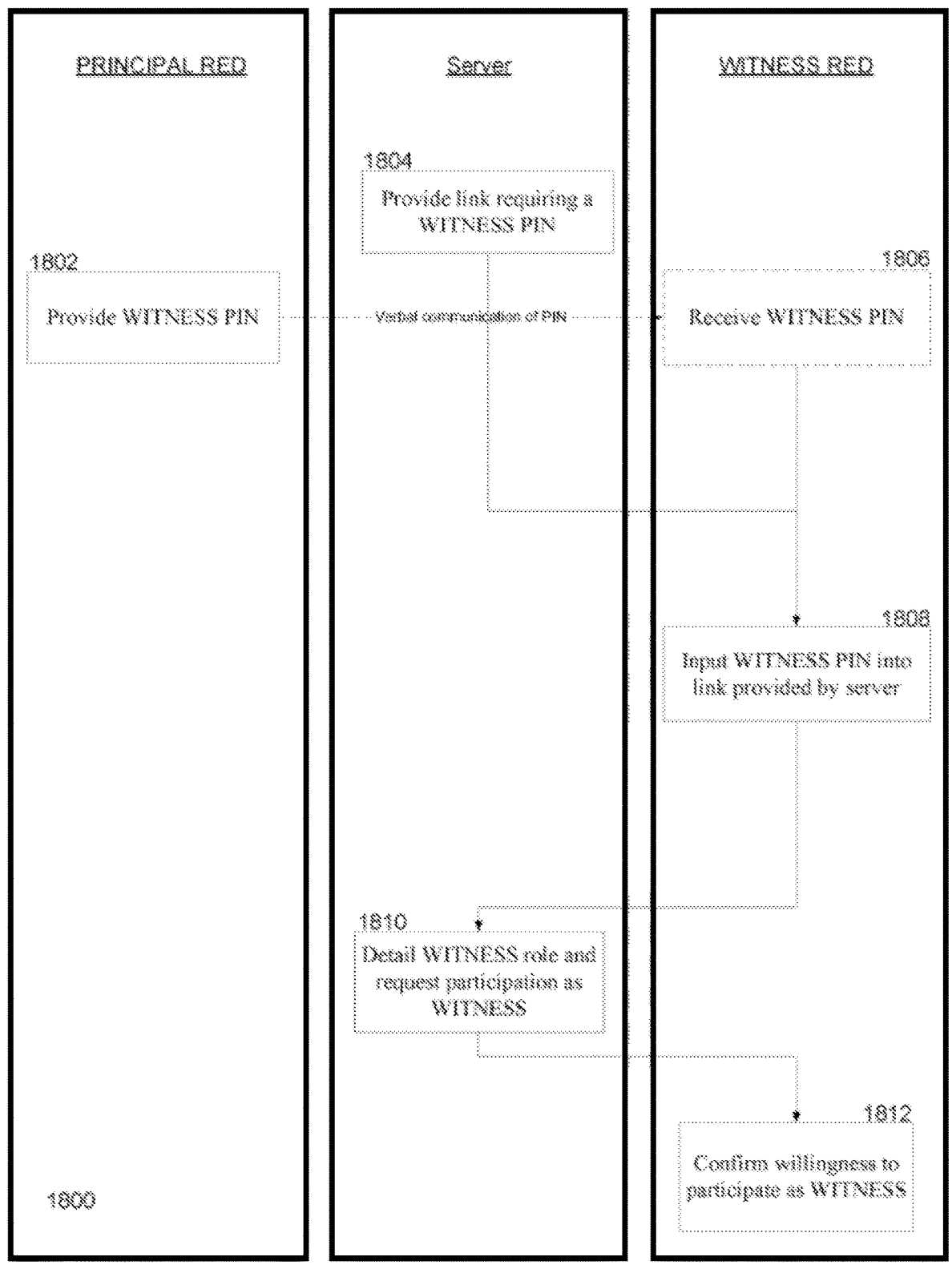
FIG. 18 depicts an exemplary partial flow diagram for a method of electronically providing a legal instrument
Figure 19:
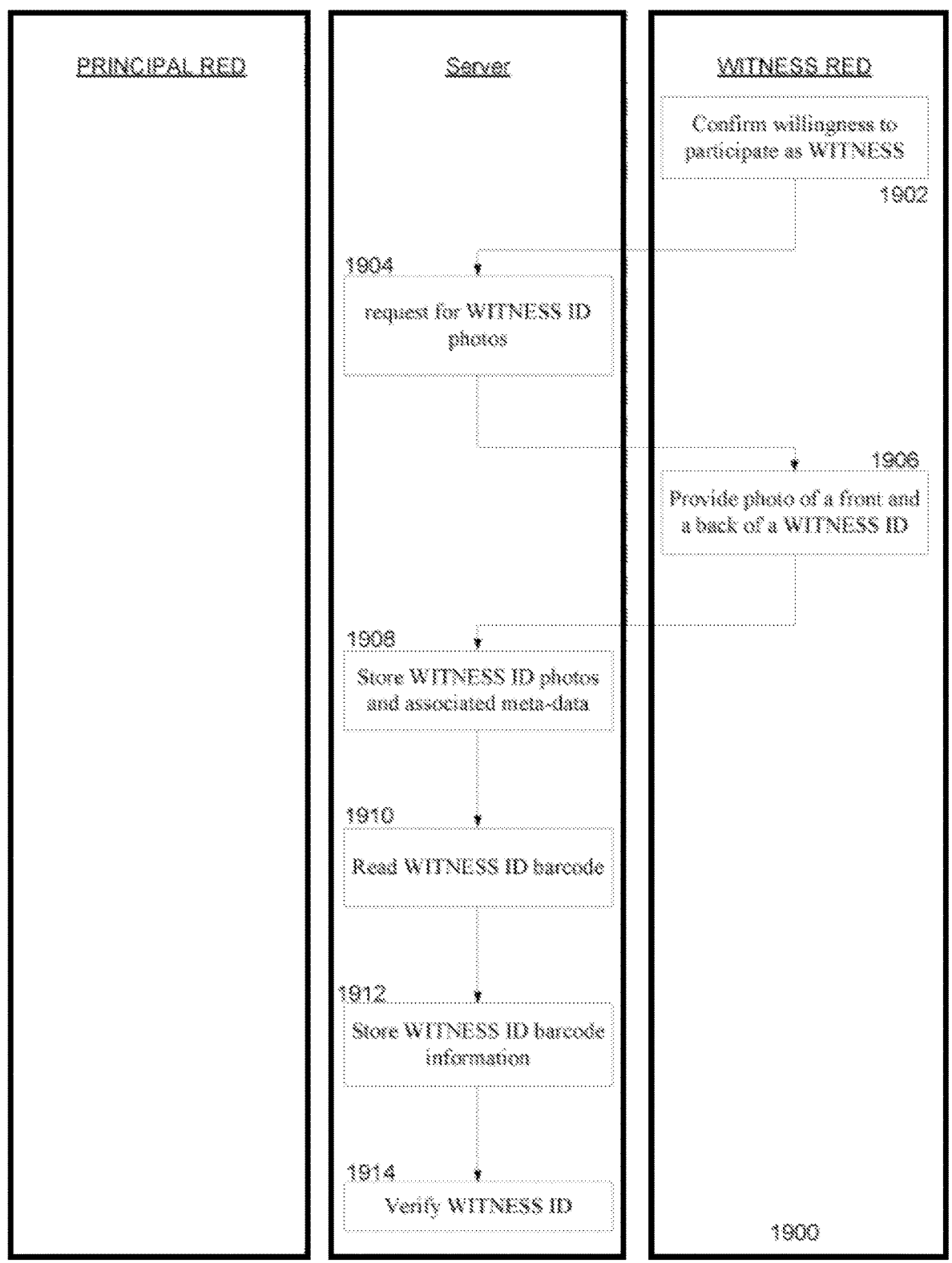
FIG. 19 depicts an exemplary partial flow diagram for a method of electronically providing a legal instrument
Figure 20:
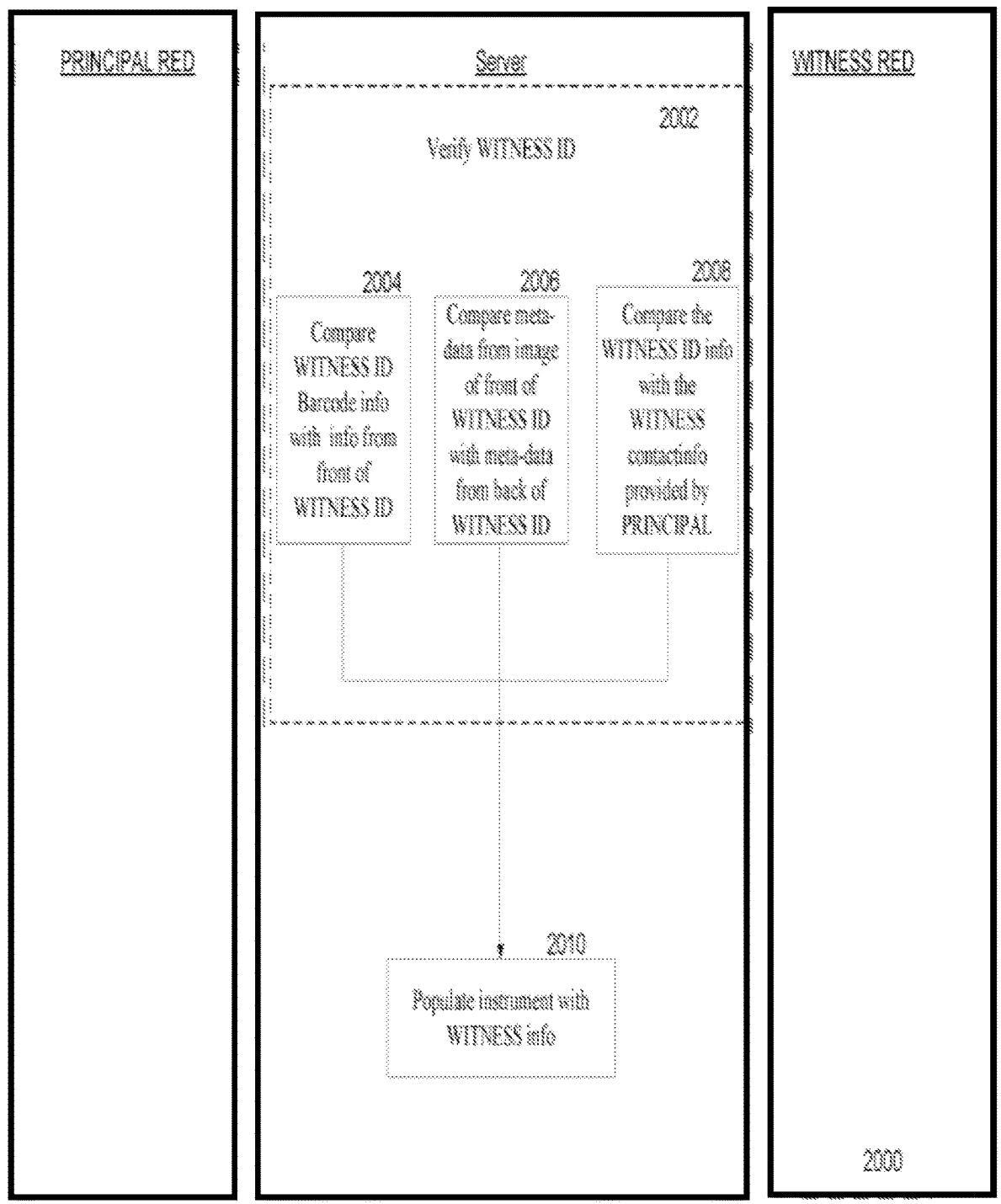
FIG. 20 depicts an exemplary partial flow diagram for a method of electronically providing a legal instrument
Figure 21:
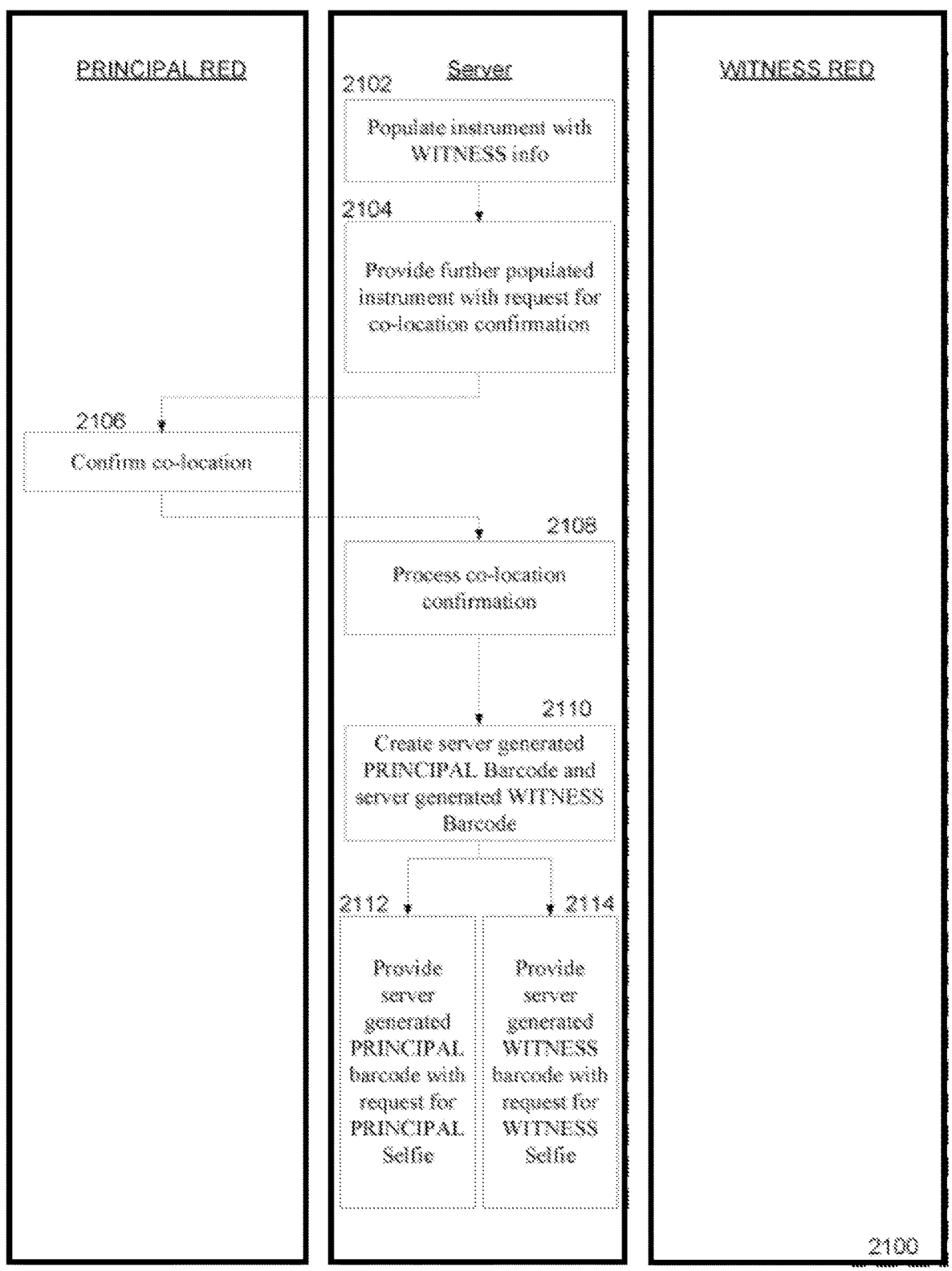
FIG. 21 depicts an exemplary partial flow diagram for a method of electronically providing a legal instrument
Figure 22:
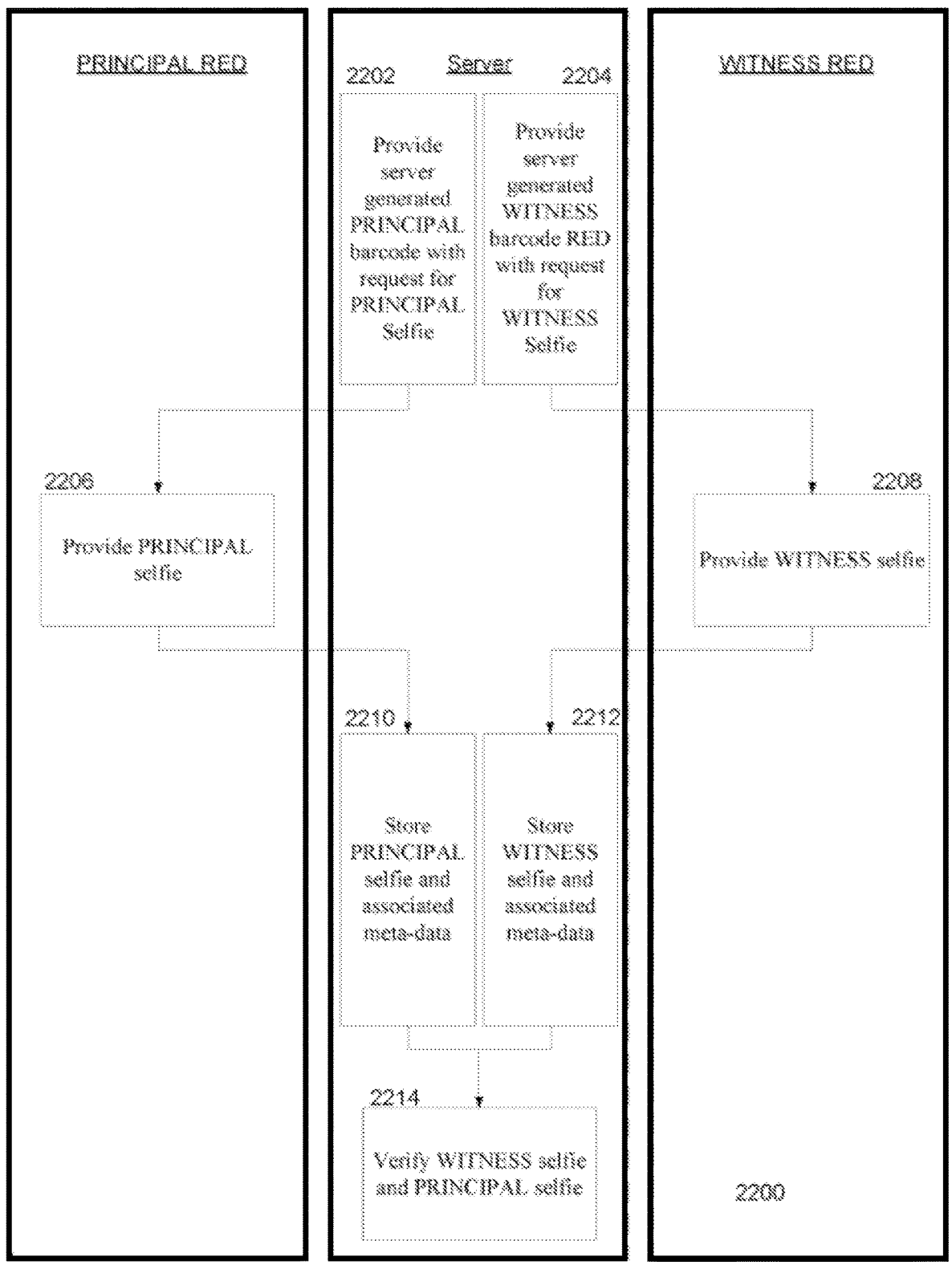
FIG. 22 depicts an exemplary partial flow diagram for a method of electronically providing a legal instrument
Figure 23:
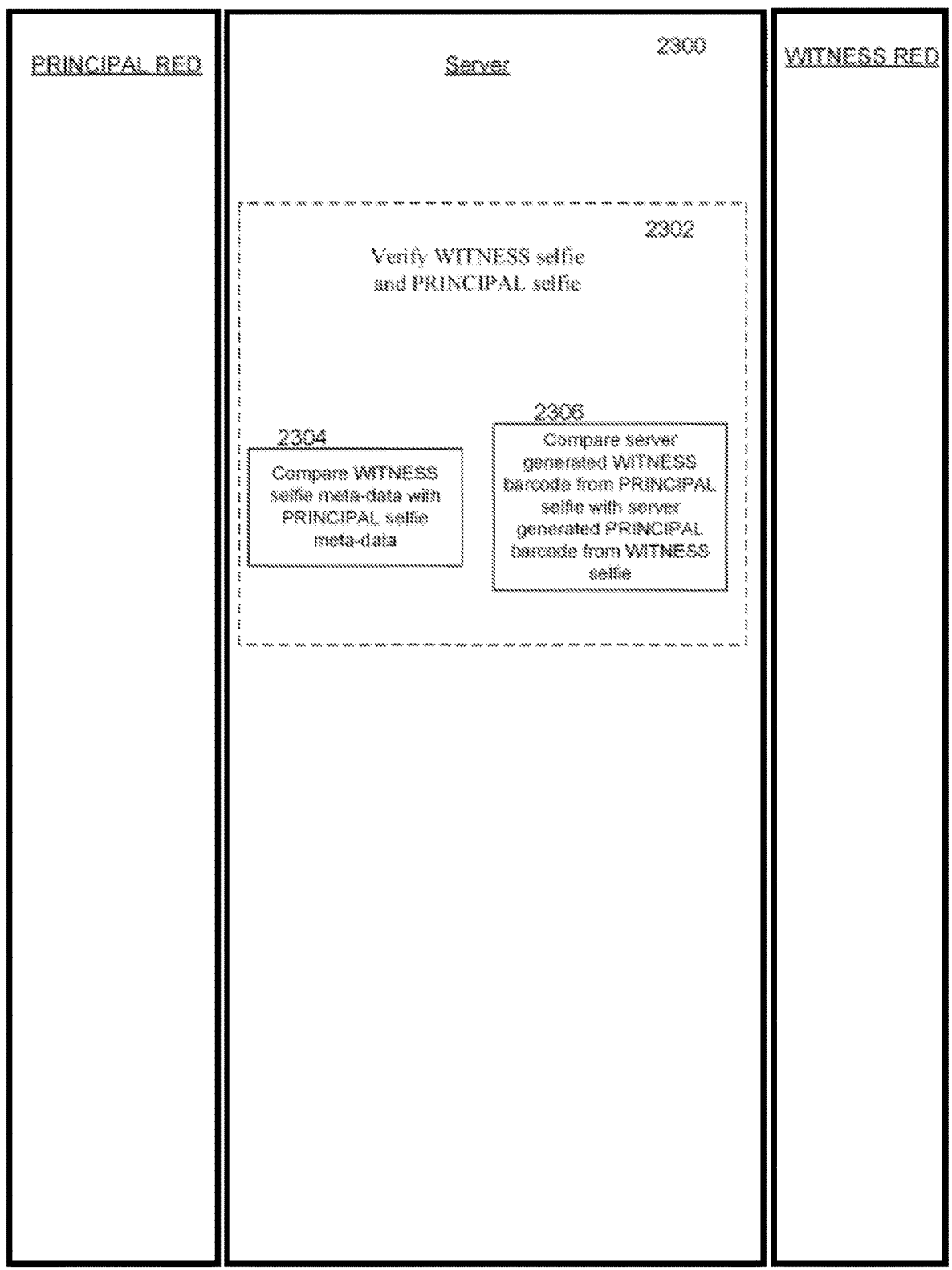
FIG. 23 depicts an exemplary partial flow diagram for a method of electronically providing a legal instrument
Figure 24:
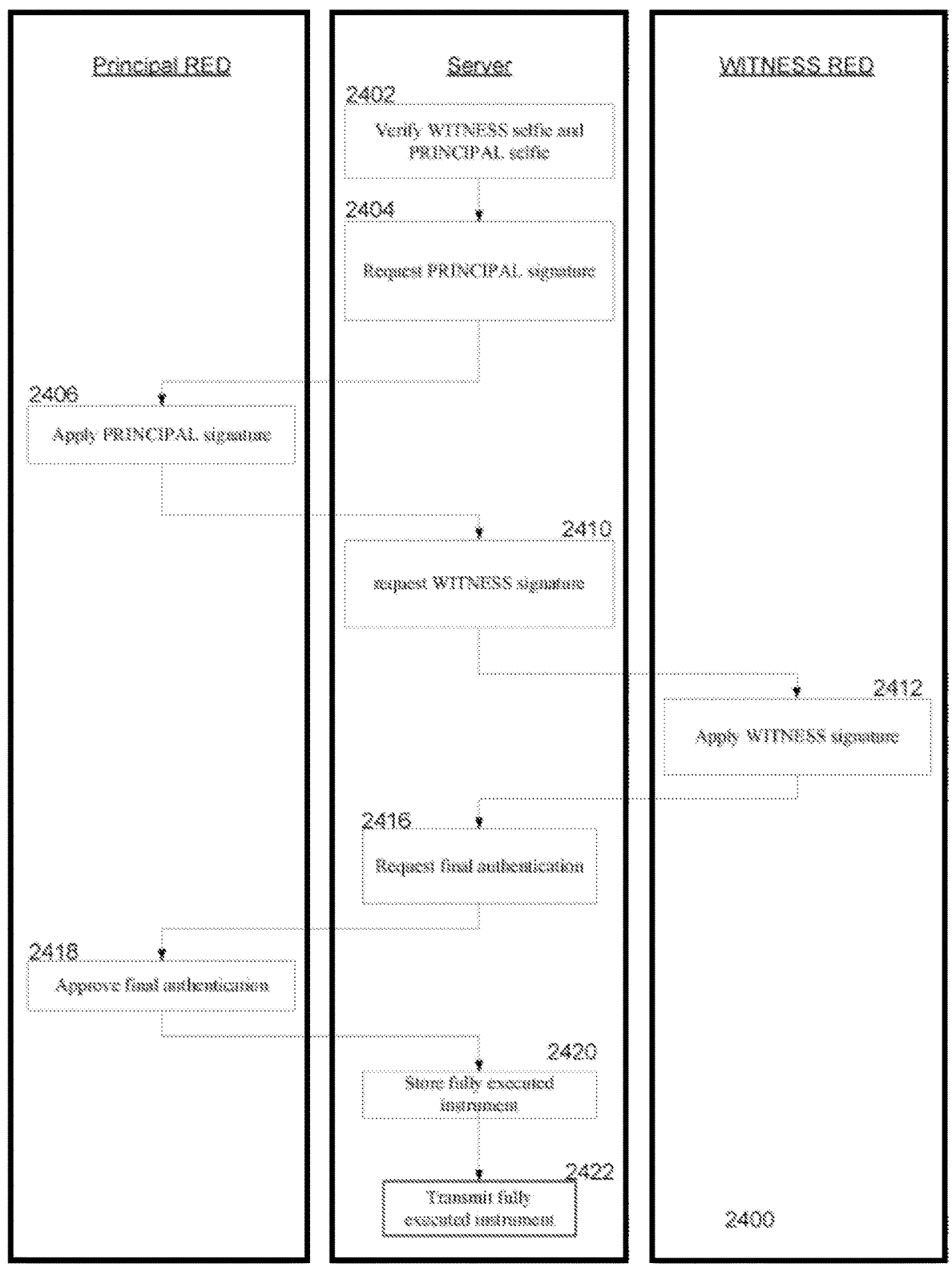
FIG. 24 depicts an exemplary partial flow diagram for a method of electronically providing a legal instrument

With reference to FIG. 10, a distributed system for providing a legal instrument may comprise a server 1002, a principal remote electronic device 1028, and a witness remote electronic device 1052. The server 1002, the principal remote electronic device 1028, and the witness remote electronic device 1052 may be connected through a suitable communications network 1026 such as the internet. The server 1002 may comprise a processor 1004 for executing instructions, a network adapter 1006 for sending and receiving information through the communications network 1026, and a database/memory 1008 for storing executable modules and other information. The memory/database 1008 may have a plurality of executable modules stored thereon, including a witness PIN confirmation module 1010 for confirming a witness PIN information, a meta-data processor module 1012 for harvesting, analyzing, and comparing meta-data, a login verification module 1014 for confirming user login credentials, an ID verification module 1016 for extracting, and analyzing images of and information from IDs, an image parsing module 1018 for parsing and analyzing information from images, a barcode generation module 1020 for generating barcodes containing unique information, a position verification module 1022 for analyzing and comparing GPS and other location information, and an information storage module 1024 for storing any/all information/data.

The principal remote electronic device 1028 and witness remote electronic device 1052 may each comprise a processor 1030/1054 for executing instructions, a network adapter 1032/1056 for sending and receiving information through the communications network 1026, a camera 1034/1058 (or other such suitable imaging device) for capturing images, an input interface 1036/1060 for receiving user inputs, a display 1038/1062 for providing a user with a visual display of information, a GPS module 1048/1068 for determining location information, a meta-data module 1050/1070 for providing meta-data, and a database/memory 1040/1064 for storing executable modules and other information. The database/memory 1040/1064 may have a plurality of executable modules stored thereon, including an image capture module 1042/1072 for capturing and storing images, an execution module 1044/1074 for enabling the execution of an instrument, and a document viewer module 1046/1076 for enabling the displaying of an instrument.

In reference to FIGS. 11-24, an embodiment, a method of electronically executing a legal instrument may include a principal logging onto a server 1102 through a web or application portal on a remote electronic device. This may act as a first level of authentication of the principal's identity. This login 1102 may be performed with a username and password, or may be password-less in which a one-time pin is text messaged to the user's device and expire after the one-time usage or if not utilized within a certain timeframe. In the account the principal may provide 1104 a variety of information related to their identity and financial accounts. The server may or may not already have a profile containing the principal's identity information. If such information has not already been provided, the principal may be prompted to input such identity information. Such identity information materials may include, by way of example, a social security number, a BlockScore, Equifax or other form of credit or background report, information identifying the device the principal uses to access the account, etc.

Once the server has received sufficient identity information related to the principal, the principal may request 1106 that the server provide them with a legal instrument. The legal instrument that the principal may request 1106 from the server may include, but is not limited to, a limited power of attorney, a general power of attorney, an assignment of right, a will/trust document, or any other suitable legal instrument which may be validly executed by the systems and methods disclosed herein. Responsive to the principal's request 1106, the server may create 1108 the requested legal instrument, may populate 1110 details for the legal instrument and may allow the principal to view the populated legal instrument via the principal's remote electronic device. The principal may then review the document on their remote electronic device and confirm 1114 that the details of the document are consistent with their intentions. Once the principal has confirmed 1114 that the document is consistent with their desires they may transmit a confirmation to the server and the server may store 1116/1202 the confirmed instrument in memory.

Embodiments may require the instrument being created 1108 and populated 1110 to correspond to the requirements of the jurisdiction in which the principal is a resident. The principal's residency may be determined by one or more of the information provided by the principal and information parsed from the principal's government issued identification card ("ID").

The server may request 1204/1302, from the principal, pictures of the front and back of the principal's ID. The principal may use a digital camera incorporated into their remote electronic device to capture 1304 images of both the front and back of their ID, and may transmit 1304 those images, along with associated meta-data, to the server. Such meta-data may include, but is not limited to GPS location information, IP addresses, browsers being used, models of the remote electronic devices being used, cookies, exchangeable image file format ("EXIF") data, media access control ("MAC") addresses, time the picture was taken, time the image was digitized, etc. The server may use software to read 1308 the barcode on the back of the principal's identification card to recover any information associated therewith. The server may store 1306 the pictures of the ID, the meta-data associated with said pictures, and the information scraped from ID's barcode in memory. In embodiments the server may compare 1408 the information from the ID with the identity information previously provided 1104 by the principal to confirm that the identification card belongs to the person requesting the legal instrument. The server may also compare 1404/1406 the information from the front of the principal ID with the information from the back of the principal ID to confirm that they are from the same ID. The server may also compare 1404/1406 the meta data from the two pictures to determine they were both taken from the same advice engaging in this transaction, and within a certain time frame. These comparisons 1404/1406/1408 may be used to verify 1312/1402 the principal ID.

The server may prompt 1206 the principal for contact information for one or more witnesses. Such identity information may include the full name of the witness and their contact information, such as their phone number for SMS purposes, or their email address.

While steps of the methods disclosed herein may be performed in any suitable order, it may be preferable to take all steps possible to verify the identity of the principal prior to contacting the witness in order to condense steps involving the witness to as minimal a time period and number of communications as possible. This may help reduce any burdens being placed on the witness throughout the process.

The server may additionally prompt 1208/1602 the principal to provide 1604 a witness personal identification number ("PIN") for the witness to use as a passcode. In embodiments the PIN may not have to be a number, but instead may be a different form of personal identifier, such as but not limited to, a password, an alphanumeric string, etc. The PIN may be received and stored 1606/1702 by the server. In embodiments, the PIN may not be electronically transmitted to the witness by the server, but must instead be conveyed 1802 from the principal to the witness directly. This transfer 1802 of the witness PIN separately from the system may provide for additional security in that the principal must be in direct, personal contact with the witness. This external transmission 1802 of the witness PIN from the principal to the witness may, preferably, be done verbally so as to reduce the likelihood that both the link provided by the server and the PIN required to authenticate the witness through said link are accidentally provided to the same, incorrect, contact.

The server may transmit 1708/1804, such as by SMS or email, a message to the witness using the contact information previously provided 1504 by the principal. The message may contain a link that the witness may follow to take the witness to a website or application page generated by the server. The witness may be prompted 1708/1804 to enter the witness PIN that was provided 1504 by the principal before continuing any further. Once the witness enters 1808 the witness PIN, and the server confirms that the witness PIN entered 1808 by the witness matches the sored 1606 witness PIN provided 1504 by the principal, the server may transmit 1810 information to the witness detailing the witness's role in the execution of the instrument and request that the witness confirm 1812/1902 their willingness to participate in the execution process. Once the witness confirms 1812/2902 their willingness to participate, the server may allow the witness to view the populated legal instrument via the witness' remote electronic device so that the witness may review the instrument.

The server may request 1904, from the witness, pictures of the front and back of the witness' ID. The witness may use a digital camera incorporated into their remote electronic device to capture 1906 pictures of both the front and back of their ID, and may transmit 1906 those images, along with any associated meta-data, to the server. The server may use software to read 1910 the barcode on the back of the witness' identification card to recover information associated therewith. The server may compare 2004/2006/2008 the information pulled from the barcode of the witness identification card with the information from the front of the witness ID, as well as with the witness contact information previously provided 1504 by the principal. The server may request confirmation of any information that does not match up between the two sets of data. The server may use the confirmed information to populate 2010/2102 the instrument with witness identity information.

In order to verify 1312/1402/1914/2002 the IDs of the principal and witness the server may take the image of the front of the card, save the image of the entire front of the ID, extract the picture of the individual on the ID, and pares out any further ID information that is located on the front of the card. The server may also use software to read the barcode from the back of the ID and extract and store any information contained therein. Then the information gathered from the barcode on the back of the ID may be compared 1404/2004 against the information from the front of the ID in order to confirm that the front of the ID matches the back of the ID.

In embodiments, the server may use pattern recognition software to confirm that the picture of the individual on the ID is the principal or witness, and may do so through comparing it against prior stored data, or against the faces of the principal/witness present in the selfies that are provided by the principal and witness at a later point in the method.

The server may prompt 2104 at least one of the principal and the witness (preferably the principal so as to minimize witness burden) to confirm 2106 when they are physically present with the other party. When one of the parties indicates 2016 that they are physically present with the other party the server may request 2112/2114/2202/2204 information designed to corroborate the parties' co-location, such as but not limited to GPS location information, IP addresses, selfies with associate meta-data, etc. from the remote electronic devices of the principal and the witness. The server may store 2210/2212 and/or compare 2304/2306 the location information provided by the parties' remote electronic devices.

In embodiments, the remote electronic devices may have to authorize the sending of GPS or other information to the server. In such cases the remote electronic devices may prompt their associated user for approval to access and send said data. If such data is not provided the server may notify the principal and/or witness remote electronic device that does not provide GPS information that they may not be able to proceed with the execution of the instrument.

In addition, or in the alternative, to GPS information, other information for determining co-location, such as the witness remote electronic device and the principal electronic device each confirming that they are mutually connected via a Bluetooth or NFC connection, may be collected and sent to the server in order to confirm the proximity of the remote electronic devices relative to one another.

Once co-location of the principal and witness has been confirmed 2106 the server may transmit 2112/2114/2202/2204 a server generated barcode to at least one of the principal's and witness' remote electronic device, and request 2112/2114/2202/2204 that the parties use one of their remote electronic devices to take 2206/2208 a photograph containing the faces of the principal and the witness, and the barcode previously sent by the server (a "selfie") (the server generated barcode may be displayed on one of the parties' remote electronic devices). The server generated barcode provided 2114/2204 to the witness and the server generated barcode provided 2112/2202 to the principal may be different than one another. Further, said two server generated barcodes may comprise a time limit or clock, which may be referenced by the barcodes but may be stored and processed by the server, during which a principal selfie and a witness selfie may have to be captured 2206/2208 and/or transmitted 2206/2208 in order for the server to accept the selfies. The taking 2206/2208 and/or transmitting 2206/2208 of the selfies within a designated time-period may assist with corroborating the co-location of the principal and witness during the timeframe of the execution. In embodiments a server generated barcode may comprise identity information of the person to whom the barcode was transmitted, the person with whom the recipient of the barcode is purportedly co-located, and timing/clock information. Embodiments may require such pictures showing the parties together and the barcode to be sent 2206/2208 to the server from each of the remote electronic devices associated with the parties. The selfies along with all associated location information and meta-data may be stored 2210/2212 by the server.

A witness selfie may mean a selfie as described herein as taken from and transmitted to the server by the remote electronic device associated with a witness. A principal selfie may mean a selfie as described herein as taken from and transmitted to the server by the remote electronic device associated with the principal.

In embodiments a selfie may comprise two separate images, one of which may include the faces of the principal and witness, and the other of which may include the server generated barcode provided principal/witness. Such a two-part selfie may be necessary in the event that a single picture fails to have sufficient resolution to render the faces of the parties as well as the server generated barcode.

As a practical matter, the selfie with the server generated barcode sent to the principal should be taken from the remote electronic device associated with the witness, and the selfie with the server generated barcode sent to the witness should be taken from the remote electronic device associated with the principal. This would be due the fact that, generally, the server generated barcode sent to one party would be displayed on the remote electronic device associated with that party in the selfie being captured by the remote electronic device associated with the other party.

The meta-data associated with the selfies may be compared 2304 with one another and with other stored meta-data from other transmissions to ensure that the selfies are not being transmitted by the same remote electronic device and/or to confirm that the selfies are being transmitted from the remote electronic devices associated with the parties to the execution of the instrument, and to confirm that the selfies are being transmitted from the same geo-location. Additionally, the selfies may be compared 2306 with the server generated barcodes to further confirm their veracity.

In embodiments, if desired, the server may request a video-chat with the parties in order to confirm that they are indeed physically present together, and they are who they say they are. The picture(s), and video-chat recording, along with any meta-data associated therewith, may be stored by the server. In embodiments, the meta-data associated with the photographs may be compared 2304 with one another to help corroborate their generation. For example, the group pictures sent from the principal's remote electronic device and the group pictures sent from the witness remote electronic device may be required to have timestamps that are within a predetermined time frame.

Meta-data, including GPS, other location data may be compared between different transmissions to ensure that there are at least minor changes in said location data (which may correspond to deminimus motions and changes of location of the remote electronic devices during the course of the performance of the method. This comparison may assist in determining whether or not the transmissions are not being sent from devices in drastically different locations or being emulated on a computer. If there is no change in such data, or if the data is identical between the different remote electronic devices the server may flag the data as untrustworthy.

Information and meta-data associated with any transmission received by the server may be compared with any information and meta-data associated with any other transmission received by the server, and/or with any information or meta-data stored in the server's memory/database.

In an embodiment, a proximity based data connection, such as Bluetooth or near field communication ("NFC"), may be used to corroborate the co-location of the remote electronic devices associated with the principal and the witness. This may be used in the alternative to, or in conjunction with, GPS and other co-location information.

Once the co-location of the parties has been confirmed 2402/2302/2214 by the server, the server may provide 2404/2410 to the parties' remote electronic devices places for the parties to sign the instrument as appropriate. Generally, the server should request 2404 that the principal sign 2406 the instrument prior to requesting 2410 the witness sign 2412 the instrument. Such an ordering of execution will assist in corroborating that the witness' execution 2412 of the instrument is corroborating the witness' witnessing the principal's prior execution 2406 of the instrument.

In embodiments the parties to the execution of the legal instrument may provide 2406/2412 their signatures through physically inputting their signature into the remote electronic device associated with them through the use of an input device such as a touch screen interface. Alternatively, the parties may sign the instrument by acceptance of a prompt generated by the server. The physical signature may be preferable as it could provide the system with further information that may be used to corroborate the identities of the executing parties.

The instrument being executed by the principal and witness may be hosted on the server, such that the principal and witness are uploading their respective signatures to the server-based document, rather than executing documents on their respective remote electronic devices and having the plurality of executed instruments compiled into a single document on the server.

In embodiments, once the instrument is fully executed, the server may request 2416 that the principal confirm 2418 that they wish the executed instrument to be finalized or not. If the requestor elects to not have the instrument finalized the server may delete the document, delete the signatures, or otherwise prevent the executed instrument from being finalized. This step may be provided to act as a final veto by which the principal may decide to finally accept or reject the completion of the instrument. Once finalization of the instrument has been approved 2418 by the principal the server may store 2402 the fully executed instrument in its memory/database.

Once the instrument is completely executed and the principal has approved 2418 finalization, the server may transmit 2422 copies the fully executed instrument to one or more of the parties via a suitable electronic transmission medium, such as SMS or email for record keeping purposes. The instrument may be transmitted 2422 in a format configured to prevent any modification, such as a .pdf format.

In instances when there is a plurality of witnesses, and one or more witnesses are located in geographic areas that are different from one another, and correspondingly when one or more witnesses cannot bear to witness the execution of the instrument at the same time, the steps of the method establishing co-location of the principal/witness and the execution of the instrument by the principal and witness may be iterated each time a different witness is present to confirm the principal's execution. This methodology may require the principal to perform redundant executions of the instrument; however, if desired, the server may consolidate the principal's redundant signatures into a single signature, and may still provide the signature of the plurality of witnesses despite the fact that they were provided at different times and/or in different places.

In jurisdictions in which eNotarization of legal instruments are allowed, a eNotary may be used. An eNotary is a Notary Public who notarizes documents electronically. One of the methods employed by eNotaries is the use of a digital signature and digital notary seal to notarize digital documents and validate with a digital certificate. Electronic notarization is a process whereby a notary affixes an electronic signature and notary seal using a secure Public key to an electronic document (such as a PDF or Word document). Once affixed to the electronic document, the document is rendered tamper evident such that unauthorized attempts to alter the document will be evident to relying parties. The e-notary will use cryptography and Public key infrastructure to create, manage, distribute, use, store, and revoke the digital certificate. The Electronic Notary also must keep an electronic register of each act performed. In the case of an electronic notarization, satisfactory evidence of identity may be based on video and audio conference technology. In such eNotary approved jurisdictions a number of the method steps with regard to the physical witnessing of the execution of the instruments, as disclosed herein, may be omitted.

The server may be configured to store in an associated memory/database any or all information transmitted to it by any party to the execution. Such storage of information may be crucial to the server's ability to verify authenticity of any data it receives. Such data may include meta-data associated with any or all transmissions from any remote electronic devices received by the server. The meta-data associated with a transmission may be compared against other meta-data associated with the same transmission, and/or with meta-data associated with a different transmission, and/or with other information stored in the memory/database associated with the server. An example of meta-data from a single transmission being compared with other meta-data associated with that transmission may be the comparison of the timestamp of the creation of an image with the timestamp of the storage of that image in the memory of the remote electronic device. If the time of creation of the image differs significantly (e.g. more than a second) from the time of the storage of the image the data may be flagged as a possible problem since such a time difference may be associated with the image being edited or otherwise modified. An example of meta-data from one transmission being compared with meta-data from another transmission may be the comparison of the remote electronic device model used to take the picture of the principal's ID with the remote electronic device model used to take the principal's selfie. If the remote electronic device model differs between such two transmissions that should be coming from the same device, or for any transmissions that should be coming from the same device, the transmissions may be flagged as a possible problem since the transmissions should be originating from a single remote electronic device.

In embodiments the steps of the methods disclosed herein may be performed in a back-and-forth manner wherein the requests and responses to requests are transmitted between the server and the remote electronic devices in series, with one step being completed before the next step begins. This back-and-forth progression may assist in the prevention of data spoofing, and thereby assist with the security of the system. Alternative embodiments may allow for a bundling of steps, wherein more than one request and/or response may be compiled together and transmitted at the same time.

Further, although exemplary devices and figures to implement the elements of the disclosed subject matter have been provided, one skilled in the art, using this disclosure, could develop additional hardware and/or software to practice the disclosed subject matter and each is intended to be included herein. In addition to the above described embodiments, those skilled in the art will appreciate that this disclosure has application in a variety of arts and situations and this disclosure is intended to include the same.

What is claimed is:

1. A computer-implemented method for automatically verifying execution of a document, the method comprising:
   storing identity information of a first user and a second user;
   receiving, by a server, a request from a first device of the first user to create a document for the first user;
   creating, by the server, an unexecuted version of the document requested by the first user;
   generating, by the server, a barcode that is associated with a time limit before the barcode expires;
   transmitting, by the server, the barcode and a request for a photograph including the first user, the second user acting as a witness to an execution of the legal document by the first user, and the barcode to at least one of the first device of the first user and a second device of the second user;

receiving, by the server, the requested photograph from one of the first device of the first user or the second device of the second user;

verifying, by the server, that faces included in the requested photograph are of the first user and the second user based on the stored identity information, and that the barcode is included in the photograph;

responsive to receiving the photograph prior to the expiration of the time limit of the barcode and the verification, requesting, by the server, a signature from the first user via the first device and a signature from the second user via the second device;

receiving, by the server, the requested signature from the first user from the first device and the requested signature from the second user via the second device;

applying, by the server, the signature from the first user and the signature from the second user to the unexecuted version of the legal document to convert the unexecuted version of the legal document to an executed version of the legal document; and storing, by the server, the executed version of the legal document.

2. The computer-implemented method of claim 1, further comprising:

receiving, by the server, the identity information from the first device of the first user that includes first photographic identification of the first user responsive to requesting the first photographic identification from the first user;

verifying, by the server, an identify of the first user that requested to create the legal document based on the first photographic identification;

receiving, by the server, the identity information from the second device of the second user that includes second photographic identification of the second user responsive to requesting the second photographic identification from the second user; and verifying, by the server, an identify of the second user that will act as the witness to the execution of the legal document by the first user based on the second photographic identification.

3. The computer-implemented method of claim 1, further comprising:

receiving, by the server, a confirmation from the second device of the second user that the second user will act as the witness to the execution of the legal document by the first user responsive to transmitting a request for the confirmation to the second device.

4. The computer-implemented method of claim 3, further comprising:

receiving, by the server, contact information of the second user from the first device of the first user; and wherein the request for the confirmation of the second user to act as the witness is transmitted responsive to receiving the contact information from the first user.

5. The computer-implemented method of claim 3, wherein receiving the confirmation comprises:

receiving a personal identification number from the second device of the second user, the personal identification number provided to the second user from the first user; and verifying, by the server, that the personal identification number received from the second device of the second user matches a stored personal identification number associated with the first user.

6. The computer-implemented method of claim 1, further comprising:

confirming co-location of the first user and the second user based on GPS location information associated with the first device and the second device; and wherein the barcode is generated responsive to the confirmation.

7. The computer-implemented method of claim 1, wherein generating the barcode comprises:

generating a first barcode for the first user and a second barcode for the second user, wherein the first barcode and the second barcode are different; and wherein the transmitting the barcode comprises transmitting the first barcode and the request for the photograph to the first device of the first user and transmitting the second barcode and the request for the photograph to the second device of the second user.

8. The computer-implemented method of claim 7, wherein receiving the requested photograph comprises:

receiving a first photograph from the second device of the second user, the first photograph including the first barcode transmitted to the first user and faces of the first user and the second user; and receiving a second photograph from the first device of the first user, the second photograph including the second barcode transmitted to the second user and the faces of the first user and the second user.

9. A computer-implemented method for automatically verifying execution of a legal document, the method comprising:

storing identity information of a first user and a second user;

receiving, by a server, a request from a first device of the first user to create a legal document for the first user;

creating, by the server, an unexecuted version of the legal document requested by the first user;

generating, by the server, a first barcode for the first user, the first barcode associated with a first time limit before the first barcode expires;

generating, by the server, a second barcode for the second user, the second barcode associated with a second time limit before the second barcode expires;

transmitting, by the server, the first barcode and a request for a first photograph including the first user, the second user, and the second barcode to the first device of the first user;

transmitting, by the server, the second barcode and a request for a second photograph including the first user, the second user, and the first barcode to the second device of the second user;

receiving, by the server, the first photograph from the first device of the first user and the second photograph from the second device of the second user;

verifying, by the server, that faces included in the first photograph are of the first user and the second user based on the stored identity information, and that the second barcode of the second user is included in the first photograph;

verifying, by the server, that faces included in the second photograph are of the first user and the second user based on the stored identity information, and that the first barcode of the first user is included in the second photograph;

responsive to respectively receiving the first photograph and the second photograph prior to the expiration of the first time limit of the first barcode and the expiration of the second time limit of the second barcode and the verifications, requesting, by the server, a signature from the first user via the first device and a signature from the second user via the second device;

receiving, by the server, the requested signature from the first user from the first device and the requested signature from the second user via the second device;

applying, by the server, the signature from the first user and the signature from the second user to the unexecuted version of the legal document to convert the unexecuted version of the legal document to an executed version of the legal document; and storing, by the server, the executed version of the legal document.

10. The computer-implemented method of claim 9, further comprising:

receiving, by the server, the identity information from the first device of the first user that includes first photographic identification of the first user responsive to requesting the first photographic identification from the first user;

verifying, by the server, an identify of the first user that requested to create the legal document based on the first photographic identification;

receiving, by the server, the identity information from the second device of the second user that includes second photographic identification of the second user responsive to requesting the second photographic identification from the second user; and verifying, by the server, an identify of the second user that will act as the witness to the execution of the legal document by the first user based on the second photographic identification.

11. The computer-implemented method of claim 9, further comprising:

receiving, by the server, a confirmation from the second device of the second user that the second user will act as the witness to the execution of the legal document by the first user responsive to transmitting a request for the confirmation to the second device.

12. The computer-implemented method of claim 11, further comprising:

receiving, by the server, contact information of the second user from the first device of the first user; and wherein the request for the confirmation of the second user to act as the witness is transmitted responsive to receiving the contact information from the first user.

13. The computer-implemented method of claim 11, wherein receiving the confirmation comprises:

receiving a personal identification number from the second device of the second user, the personal identification number provided to the second user from the first user; and verifying, by the server, that the personal identification number received from the second device of the second user matches a stored personal identification number associated with the first user.

14. The computer-implemented method of claim 9, further comprising:

confirming co-location of the first user and the second user based on GPS location information associated with the first device and the second device; and wherein the first barcode and the second barcode are generated responsive to the confirmation.

15. A computer-implemented method for automatically verifying execution of a legal document, the method comprising:

storing identity information of a user and a notary;

receiving, by a server, a request from a first device of the user to create a legal document for the user;

creating, by the server, an unexecuted version of the legal document requested by the user;

generating, by the server, a barcode that is associated with a time limit before the barcode expires;

transmitting, by the server, the barcode and a request for a photograph including the user, the notary acting as a witness to an execution of the legal document by the user, and the barcode to at least one of the first device of the user and a second device of the notary;

receiving, by the server, the requested photograph from one of the first device of the user or the second device of the notary;

verifying, by the server, that faces included in the requested photograph are of the user and the notary based on the stored identity information, and that the barcode is included in the photograph;

responsive to receiving the photograph prior to the expiration of the time limit of the barcode and the verification, requesting, by the server, a signature from the user via the first device and a signature from the notary via the second device;

receiving, by the server, the requested signature from the user from the first device and the requested signature from the notary via the second device;

applying, by the server, the signature from the user and the signature from the notary to the unexecuted version of the legal document to convert the unexecuted version of the legal document to an executed version of the legal document; and storing, by the server, the executed version of the legal document.

16. The computer-implemented method of claim 15, further comprising:

receiving, by the server, a confirmation from the second device of the notary that the notary will act as the witness to the execution of the legal document by the user responsive to transmitting a request for the confirmation to the second device.

17. The computer-implemented method of claim 16, further comprising:

receiving, by the server, contact information of the notary from the first device of the user; and wherein the request for the confirmation of the notary to act as the witness is transmitted responsive to receiving the contact information from the user.

18. The computer-implemented method of claim 16, wherein receiving the confirmation comprises:

receiving a personal identification number from the second device of the notary, the personal identification number provided to the notary from the user; and verifying, by the server, that the personal identification number received from the second device of the notary matches a stored personal identification number associated with the user.

19. The computer-implemented method of claim 15, further comprising:

confirming co-location of the user and the notary based on GPS location information associated with the first device and the second device; and wherein the barcode is generated responsive to the confirmation.

20. The computer-implemented method of claim 15, wherein generating the barcode comprises:
- generating a first barcode for the user and a second barcode for the notary;
- wherein the transmitting the barcode comprises transmitting the first barcode and the request for the photograph to the first device of the user and transmitting the second barcode and the request for the photograph to the second device of the notary; and
- wherein receiving the requested photograph comprises:
  - receiving a first photograph from the second device of the notary, the first photograph including the first barcode transmitted to the user and the faces of the user and the notary; and
  - receiving a second photograph from the first device of the user, the second photograph including the second barcode transmitted to the notary and the faces of the user and the notary.

\* \* \* \* \*

UNITED STATES PATENT AND TRADEMARK OFFICE
CERTIFICATE OF CORRECTION

Page 1 of 1

PATENT NO. : 11,049,205 B2
APPLICATION NO. : 16/446062
DATED : June 29, 2021
INVENTOR(S) : Kaminski et al.

It is certified that error appears in the above-identified patent and that said Letters Patent is hereby corrected as shown below:

In the Claims

In Column 33, in Claim 2, Line 34, delete "identify" and insert -- identity --, therefor.

In Column 33, in Claim 2, Line 42, delete "identify" and insert -- identity --, therefor.

In Column 35, in Claim 10, Line 24, delete "identify" and insert -- identity --, therefor.

In Column 35, in Claim 10, Line 33, delete "identify" and insert -- identity --, therefor.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*